United States Patent
Sasaki

(10) Patent No.: US 10,177,415 B2
(45) Date of Patent: Jan. 8, 2019

(54) ADHESIVE COMPOSITION FOR ELECTROCHEMICAL DEVICE, ADHESIVE LAYER FOR ELECTROCHEMICAL DEVICE, AND ELECTROCHEMICAL DEVICE

(71) Applicant: ZEON CORPORATION, Chiyoda-ku, Tokyo (JP)

(72) Inventor: Tomokazu Sasaki, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/512,177

(22) PCT Filed: Sep. 7, 2015

(86) PCT No.: PCT/JP2015/004530
§ 371 (c)(1),
(2) Date: Mar. 17, 2017

(87) PCT Pub. No.: WO2016/051674
PCT Pub. Date: Apr. 7, 2016

(65) Prior Publication Data
US 2017/0275506 A1    Sep. 28, 2017

(30) Foreign Application Priority Data

Sep. 29, 2014    (JP) ................................. 2014-199312

(51) Int. Cl.
*H01M 10/058* (2010.01)
*H01M 2/02* (2006.01)
(Continued)

(52) U.S. Cl.
CPC ........... *H01M 10/058* (2013.01); *C09J 11/08* (2013.01); *C09J 163/00* (2013.01); *C09J 201/00* (2013.01);
(Continued)

(58) Field of Classification Search
None
See application file for complete search history.

(56) References Cited

U.S. PATENT DOCUMENTS

2016/0141575 A1\* 5/2016 Sasaki ................. H01M 2/1653
429/144
2016/0141581 A1\* 5/2016 Sasaki ............... H01M 10/0525
429/144
(Continued)

FOREIGN PATENT DOCUMENTS

CN    105324868 A    2/2016
CN    106463675 A    2/2017
(Continued)

OTHER PUBLICATIONS

Apr. 4, 2017, International Preliminary Report on Patentability issued in the International Patent Application No. PCT/JP2015/004530.

*Primary Examiner* — Jonathan Crepeau
(74) *Attorney, Agent, or Firm* — Kenja IP Law PC

(57) ABSTRACT

Provided is an adhesive composition for an electrochemical device capable of forming an adhesive layer that has excellent adhesiveness in electrolysis solution and can improve electrical characteristics of an electrochemical device. The adhesive composition can be used for adhering an electrode assembly and a casing to one another. The adhesive composition contains organic particles having a core-shell structure including a core portion and a shell portion that partially covers an outer surface of the core portion. A polymer of the core portion has a degree of swelling in electrolysis solution of at least a factor of 5 and no greater than a factor of 30, whereas a polymer of the shell portion has a degree of swelling in electrolysis solution of greater than a factor of 1 and no greater than a factor of 4.

9 Claims, 1 Drawing Sheet

(51) Int. Cl.
*H01G 11/82* (2013.01)
*C09J 201/00* (2006.01)
*H01G 9/004* (2006.01)
*C09J 11/08* (2006.01)
*H01M 10/04* (2006.01)
*C09J 163/00* (2006.01)
*H01G 11/28* (2013.01)
*H01G 11/70* (2013.01)
*H01M 10/02* (2006.01)
*H01M 10/0525* (2010.01)

(52) U.S. Cl.
CPC ............ *H01G 9/004* (2013.01); *H01G 11/28* (2013.01); *H01G 11/70* (2013.01); *H01G 11/82* (2013.01); *H01M 2/02* (2013.01); *H01M 10/02* (2013.01); *H01M 10/04* (2013.01); *C08L 2207/53* (2013.01); *H01M 2/0277* (2013.01); *H01M 2/0285* (2013.01); *H01M 2/0287* (2013.01); *H01M 10/0525* (2013.01); *Y02E 60/13* (2013.01)

(56) References Cited

U.S. PATENT DOCUMENTS

2017/0155107 A1* 6/2017 Akiike .................. H01M 2/168
2017/0200932 A1* 7/2017 Sasaki .................. H01M 2/166

FOREIGN PATENT DOCUMENTS

| EP | 2477252 A1 | | 7/2012 |
| JP | 2010028007 A | | 2/2010 |
| JP | 2012204303 A | | 10/2012 |
| JP | 2012529753 A | | 11/2012 |
| JP | 2013077559 A | | 4/2013 |
| JP | 2013145763 A | | 7/2013 |
| WO | WO 2015/005145 | * | 1/2015 |
| WO | WO 2015/005151 | * | 1/2015 |

* cited by examiner

ADHESIVE COMPOSITION FOR ELECTROCHEMICAL DEVICE, ADHESIVE LAYER FOR ELECTROCHEMICAL DEVICE, AND ELECTROCHEMICAL DEVICE

TECHNICAL FIELD

The present disclosure relates to an adhesive composition for an electrochemical device, an adhesive layer for an electrochemical device, and an electrochemical device.

BACKGROUND

Electrochemical devices such as lithium ion secondary batteries, electric double-layer capacitors, and lithium ion capacitors have characteristics such as compact size, light weight, high energy-density, and the ability to be repeatedly charged and discharged, and are used in a wide range of applications. These electrochemical devices typically include an electrode assembly, an electrolysis solution, and a casing that houses the electrode assembly and the electrolysis solution in a tightly sealed manner. The electrode assembly is a laminate of a plurality of electrodes and one or more separators that isolate the electrodes from one another and prevent short-circuiting between the electrodes.

Studies have been conducted in relation to techniques for adhering an electrode assembly and a casing to one another in an electrochemical device such as described above so as to secure the electrode assembly to the casing and ensure safety and the like of the electrochemical device. In one example, PTL 1 reports that when sealing tape for a secondary battery including a first adhesive layer, having an adhesive surface, and a second adhesive layer, having an adhesive surface at an opposite side to the adhesive surface of the first adhesive layer, is used by adhering the adhesive surface of the first adhesive layer to an outer surface of an electrode assembly and adhering the adhesive surface of the second adhesive layer to an inner surface of a casing, the electrode assembly can be prevented from moving within the casing, and safety and the like of a secondary battery can be improved.

CITATION LIST

Patent Literature

PTL 1: JP 2012-529753 A

SUMMARY

Technical Problem

However, when tape according to conventional techniques such as described above is used to adhere an electrode assembly and a casing to one another, the tape may suffer from a loss of adhesiveness in electrolysis solution due to components of the tape eluting into electrolysis solution. Moreover, electrical characteristics of an electrochemical device (high-temperature cycle characteristics and low-temperature output characteristics) may be reduced.

Accordingly, there is room for improvement over the conventional techniques in terms of adequately securing an electrode assembly to a casing in electrolysis solution while enabling an electrochemical device to display excellent electrical characteristics.

Thus, one objective of the present disclosure is to provide an adhesive composition for an electrochemical device that is usable for adhering an electrode assembly and a casing to one another and that is capable of forming an adhesive layer for an electrochemical device that maintains excellent adhesiveness in electrolysis solution and enables an electrochemical device to display excellent electrical characteristics.

Another objective of the present disclosure is to provide an adhesive layer for an electrochemical device that is usable for adhering an electrode assembly and a casing to one another, that maintains excellent adhesiveness in electrolysis solution, and that enables an electrochemical device to display excellent electrical characteristics.

Yet another objective of the present disclosure is to provide an electrochemical device having excellent electrical characteristics.

Solution to Problem

The inventor conducted diligent investigation with the aim of solving the problems described above. Through this investigation, the inventor discovered that when an adhesive layer is obtained using an adhesive composition containing organic particles having a specific core-shell structure including a core portion and a shell portion that each have a specific degree of swelling in electrolysis solution, the resultant adhesive layer is capable of sufficiently inhibiting elution of components into electrolysis solution and maintaining excellent adhesiveness in electrolysis solution. Moreover, the inventor discovered that securing an electrode assembly to a casing using this adhesive layer enables an electrochemical device to display excellent electrical characteristics. These discoveries led to the present disclosure.

Specifically, the present disclosure aims to advantageously solve the problems described above by disclosing an adhesive composition for an electrochemical device that is usable for adhering an electrode assembly and a casing to one another, the adhesive composition comprising organic particles having a core-shell structure including a core portion and a shell portion that partially covers an outer surface of the core portion, wherein the core portion is formed from a polymer having a degree of swelling in electrolysis solution of at least a factor of 5 and no greater than a factor of 30, and the shell portion is formed from a polymer having a degree of swelling in electrolysis solution of greater than a factor of 1 and no greater than a factor of 4. The adhesive composition containing these organic particles, which have the specific core-shell structure including the core portion and the shell portion having specific degrees of swelling in electrolysis solution, can be used to form an adhesive layer capable of inhibiting elution of components into electrolysis solution and maintaining excellent adhesiveness. Moreover, an electrochemical device in which this adhesive layer is used to secure an electrode assembly to a casing has excellent electrical characteristics.

Herein, the "degree of swelling in electrolysis solution" of the polymers forming the core portion and the shell portion of the organic particles can be measured by the measurement method described in the EXAMPLES section of the present specification.

In the presently disclosed adhesive composition for an electrochemical device, the polymer forming the core portion preferably has a glass transition temperature of at least 0° C. and no higher than 150° C., and the polymer forming the shell portion preferably has a glass transition temperature of at least 50° C. and no higher than 200° C. When the polymers forming the core portion and the shell portion have glass transition temperatures within the aforementioned ranges, the elution of components into electrolysis solution from an adhesive layer obtained using the adhesive composition can be further inhibited, and adhesiveness of the adhesive layer in electrolysis solution and electrochemical device electrical characteristics can be further improved. Moreover, blocking of the adhesive layer obtained using the adhesive composition and a component on which the adhesive layer is formed can be inhibited.

Herein, the "glass transition temperature" of the core portion and the shell portion of the organic particles can be measured by the measurement method described in the EXAMPLES section of the present specification.

The presently disclosed adhesive composition for an electrochemical device preferably further comprises a binder having a glass transition temperature of at least −50° C. and no higher than 0° C. By using a binder having a glass transition temperature within the aforementioned range in combination with the organic particles described above, adhesiveness in electrolysis solution of an adhesive layer obtained using the adhesive composition and electrochemical device electrical characteristics can be further improved.

Herein, the "glass transition temperature" of the binder can be measured by the measurement method described in the EXAMPLES section of the present specification.

Moreover, the present disclosure aims to advantageously solve the problems described above by disclosing an adhesive layer for an electrochemical device that is usable for adhering an electrode assembly and a casing to one another, the adhesive layer being obtained using any one of the adhesive compositions for an electrochemical device described above. The adhesive layer formed using any of the adhesive compositions described above is capable of sufficiently inhibiting elution into electrolysis solution and maintaining excellent adhesiveness. Moreover, provision of the adhesive layer between an electrode assembly and a casing to adhere the electrode assembly and the casing to one another enables an electrochemical device to display excellent electrical characteristics.

Furthermore, the present disclosure aims to advantageously solve the problems described above by disclosing an electrochemical device comprising an electrode assembly, an electrolysis solution, and a casing that houses the electrode assembly and the electrolysis solution, wherein the electrode assembly and the casing are adhered to one another though the adhesive layer for an electrochemical device described above. The electrochemical device in which the previously described adhesive layer secures the electrode assembly to the casing has excellent electrical characteristics such as high-temperature cycle characteristics and low-temperature output characteristics.

Advantageous Effect

According to the present disclosure, it is possible to provide an adhesive composition for an electrochemical device that is usable for adhering an electrode assembly and a casing to one another and that is capable of forming an adhesive layer for an electrochemical device that maintains excellent adhesiveness in electrolysis solution and enables an electrochemical device to display excellent electrical characteristics.

Moreover, according to the present disclosure, it is possible to provide an adhesive layer for an electrochemical device that is usable for adhering an electrode assembly and a casing to one another, that maintains excellent adhesiveness in electrolysis solution, and that enables an electrochemical device to display excellent electrical characteristics.

Furthermore, according to the present disclosure, it is possible to provide an electrochemical device having excellent electrical characteristics.

DETAILED DESCRIPTION

Figure 1:
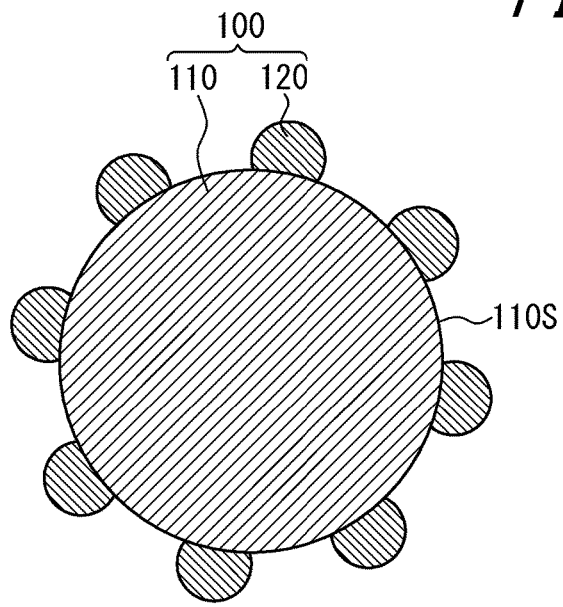
FIG. 1 is a cross-sectional view schematically illustrating an example of structure of organic particles contained in a presently disclosed adhesive composition for an electrochemical device.

The following provides a detailed description of embodiments.

A presently disclosed adhesive composition for an electrochemical device forms a presently disclosed adhesive layer for an electrochemical device through drying or the like and can be used for adhering an electrode assembly and a casing to one another in an electrochemical device. The presently disclosed adhesive layer for an electrochemical device is a layer that displays adhesiveness and is formed using the presently disclosed adhesive composition for an electrochemical device. The presently disclosed adhesive layer for an electrochemical device may be provided between an electrode assembly and a casing to adhere the electrode assembly and the casing to one another. A presently disclosed electrochemical device includes the presently disclosed adhesive layer for an electrochemical device between an electrode assembly and a casing such that the electrode assembly and the casing are adhered to one another through the adhesive layer for an electrochemical device.

(Adhesive Composition for Electrochemical Device)

The adhesive composition for an electrochemical device is a slurry composition that contains organic particles and water serving as a dispersion medium, and that may optionally contain a binder and other components.

An adhesive layer for an electrochemical device formed using the presently disclosed adhesive composition for an electrochemical device can sufficiently inhibit elution of components into electrolysis solution and maintain excellent adhesiveness in electrolysis solution. Moreover, an electrochemical device in which an electrode assembly is secured to a casing through this adhesive layer has excellent electrical characteristics such as high-temperature cycle characteristics and low-temperature output characteristics. The presently disclosed adhesive composition for an electrochemical device is usable for adhering an electrode assembly and a casing to one another. Accordingly, the adhesive composition differs from a composition used to form a porous membrane layer between an electrode and a separator, and does not normally contain non-conductive particles of alumina or the like. It should be noted that the organic particles and the binder used herein are not considered to be included within the scope of such "non-conductive particles".

<Organic Particles>

In an adhesive layer obtained using the adhesive composition, the organic particles have a function of strongly adhering an electrode assembly and a casing to one another in electrolysis solution.

The organic particles have a core-shell structure including a core portion and a shell portion that partially covers the outer surface of the core portion. The core portion is formed from a polymer having a degree of swelling in electrolysis solution of at least a factor of 5 and no greater than a factor of 30, whereas the shell portion is formed from a polymer having a degree of swelling in electrolysis solution of greater than a factor of 1 and no greater than a factor of 4.

The organic particles having the structure and properties described above display excellent adhesiveness in electrolysis solution and can also maintain excellent adhesiveness in the long-term because components of the organic particles have a low tendency to elute into electrolysis solution. Furthermore, electrical characteristics of an electrochemical device including an adhesive layer obtained using the adhesive composition can be favorably improved. The adhesive layer obtained using the adhesive composition does not display strong adhesive force prior to immersion in electrolysis solution. Consequently, the adhesive layer itself and a component on which the adhesive layer is formed are unlikely to suffer from blocking (i.e., sticking of adhesive layers to one another or of components to one another through an adhesive layer) and excellent handleability can be achieved.

Although it has not yet been clarified why the excellent effects described above are achieved through use of the organic particles, the reason for these effects is presumed to be as follows.

Specifically, the polymer forming the shell portion of the organic particles swells in electrolysis solution to a certain extent. This swelling may, for example, lead to the activation of functional groups in the swollen shell portion polymer, which enables the shell portion to strongly adhere to an electrode assembly or a casing in electrolysis solution. Furthermore, the polymer forming the core portion of the organic particles swells to a large extent in electrolysis solution. This large swelling of the polymer of the core portion can improve close adherence between the organic particles and components that are adhered through the adhesive layer. It is presumed that these characteristics of the polymers forming the shell portion and the core portion act in conjunction such that the adhesive layer containing the organic particles enables strong adhesion of an electrode assembly to a casing in electrolysis solution.

Moreover, since the degrees of swelling in electrolysis solution of the polymers of the shell portion and the core portion are each set as no greater than a certain value, these polymers do not swell excessively in electrolysis solution. This is thought to inhibit elution of components into electrolysis solution and enable the excellent adhesiveness described above to be displayed to a sufficient level even, for example, after an electrochemical device has been operated for a long time.

Furthermore, in an electrochemical device in which an electrode assembly and a casing are adhered through the adhesive layer containing the organic particles, space does not easily form between the electrode assembly and the casing because the adhesive layer causes strong adhesion between the electrode assembly and the casing in electrolysis solution as described above. Consequently, dead space is not easily formed between the electrode assembly and the casing in the electrochemical device in which the adhesive layer containing the organic particles is used, even when, for example, gas is generated inside the electrochemical device. Therefore, the flow of electrolysis solution into such dead space can be inhibited. It is presumed that for this reason, a decrease in the amount of electrolysis solution present at a reaction site of an electrochemical reaction (i.e., between electrodes) can be inhibited and excellent electrical characteristics such as high-temperature cycle characteristics and low-temperature output characteristics can be realized.

However, it is not the case that the organic particles display absolutely no adhesiveness other than when swollen in electrolysis solution. For example, the organic particles may be caused to display adhesiveness even when not in a swollen state in electrolysis solution through heating to at least a certain temperature (for example, 50° C. or higher)

[Structure of Organic Particles]

The organic particles have a core-shell structure including a core portion and a shell portion that covers the outer surface of the core portion. However, the shell portion only partially covers the outer surface of the core portion. In other words, the shell portion of the organic particles covers the outer surface of the core portion but does not completely cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, an organic particle that, for example, includes a shell portion having fine pores that pass from the outer surface of the shell portion (i.e., a circumferential surface of the organic particle) to the outer surface of the core portion is also considered to be within the scope of the organic particles described above.

Specifically, as illustrated in an example of cross-sectional structure of the organic particles in FIG. 1, each organic particle 100 has a core-shell structure including a core portion 110 and a shell portion 120. The core portion 110 is a portion of the organic particle 100 that is located further inward than the shell portion 120. The shell portion 120 is a portion of the organic particle 100 that covers an outer surface 110S of the core portion 110 and is normally an outermost portion of the organic particle 100. The shell portion 120 partially covers the outer surface 110S of the core portion 110, but does not completely cover the outer surface 110S of the core portion 110.

In the organic particles, the average percentage of the outer surface of the core portion that is covered by the shell portion (i.e., the coverage rate) is preferably at least 10%, more preferably at least 20%, and even more preferably at least 30%, and is preferably no greater than 95%, more preferably no greater than 90%, and even more preferably no greater than 70%. As a result of the coverage rate being at least the lower limit of any of the aforementioned ranges, adhesiveness of the organic particles in electrolysis solution can be raised and electrochemical device electrical characteristics such as high-temperature cycle characteristics can be further improved. Moreover, as a result of the coverage rate being no greater than the upper limit of any of the aforementioned ranges, swelling of the polymer of the core portion is not impeded by the polymer of the shell portion, which ensures binding capacity of the organic particles and thereby enables further improvement of electrochemical device electrical characteristics.

The average percentage of the outer surface of the core portion that is covered by the shell portion can be measured through observation of cross-sectional structure of the organic particles. Specifically, the average percentage can be measured by the following method.

First, the organic particles are sufficiently dispersed in a cold setting epoxy resin and are subsequently embedded to prepare a block containing the organic particles. Next, a measurement sample is prepared by cutting a flake of from 80 nm to 200 nm in thickness from the block using a microtome equipped with a diamond blade. Thereafter, the measurement sample may be dyed as necessary using ruthenium tetroxide, osmium tetroxide, or the like.

The measurement sample is then set in a transmission electron microscope (TEM) and cross-sectional structure of the organic particles is imaged. The magnification of the electron microscope is preferably a magnification that allows the cross-section of one of the organic particles to fit within the visible field. Specifically, a magnification of approximately ×10,000 is preferable.

In the imaged cross-sectional structure of the organic particle, the length D1 of a circumference corresponding to the outer surface of the core portion and the length D2 of a section where the shell portion and the outer surface of the core portion are in contact are measured. The measured lengths D1 and D2 are used in the following formula (1) to calculate the percentage Rc of the outer surface of the core portion that is covered by the shell portion in the organic particle.

$$\text{Percentage coverage } Rc(\%) = (D2/D1) \times 100 \tag{1}$$

The percentage coverage Rc is measured for at least 20 of the organic particles and an average value thereof is calculated. The average value is taken to be the average percentage of the outer surface of the core portion that is covered by the shell portion (i.e., the coverage rate).

Although the percentage coverage Rc can be calculated manually from the cross-sectional structure, it is also possible to calculate the percentage coverage Rc using commercially available image analysis software. One example of commercially available image analysis software that can be used is AnalySIS Pro (produced by Olympus Corporation).

The volume average particle diameter D50 of the organic particles is preferably at least 0.1 µm, more preferably at least 0.2 µm, and even more preferably at least 0.4 µm, and is preferably no greater than 1 µm, more preferably no greater than 0.8 µm, and even more preferably no greater than 0.7 µm. As a result of the volume average particle diameter D50 of the organic particles being at least the lower limit of any of the aforementioned ranges, electrochemical device low-temperature output characteristics can be further improved. Moreover, as a result of the volume average particle diameter D50 of the organic particles being no greater than the upper limit of any of the aforementioned ranges, adhesiveness of the organic particles in electrolysis solution can be raised and electrochemical device electrical characteristics such as high-temperature cycle characteristics can be further improved.

The volume average particle diameter D50 of the organic particles can be determined to be a particle diameter at which, in a particle diameter distribution obtained through wet measurement using a laser diffraction particle diameter distribution analyzer with respect to an aqueous dispersion of the organic particles adjusted to a solid content concentration of 15 mass %, the cumulative volume calculated from a small diameter end of the distribution reaches 50%.

The organic particles may include optional elements other than the core portion and the shell portion described above so long as the desired effects are not significantly lost as a result. Specifically, the organic particles may, for example, include a portion inside of the core portion that is formed from a different polymer to the core portion. In one specific example, a residual seed particle may be present inside of the core portion in a situation in which seed particles are used in production of the organic particles by seeded polymerization. However, from a viewpoint of more noticeably displaying the desired effects, it is preferable that the organic particles are composed by only the core portion and the shell portion.

—Core Portion—

The core portion of the organic particles is formed from a polymer that has a specific degree of swelling in electrolysis solution. Specifically, the degree of swelling in electrolysis solution of the polymer of the core portion is required to be at least a factor of 5, and is preferably at least a factor of 5.5, more preferably at least a factor of 6, even more preferably at least a factor of 8, and particularly preferably at least a factor of 9.6. Moreover, the degree of swelling in electrolysis solution of the polymer of the core portion is required to be no greater than a factor of 30, and is preferably no greater than a factor of 25, more preferably no greater than a factor of 20, even more preferably no greater than a factor of 16, and particularly preferably no greater than a factor of 13.5. As a result of the degree of swelling in electrolysis solution of the polymer of the core portion being at least the lower limit of any of the aforementioned ranges, close adherence between the organic particles and an adhesion target can be ensured through an appropriate degree of swelling of the core portion, which raises the adhesiveness of the organic particles in electrolysis solution. In addition, electrochemical device high-temperature cycle characteristics and low-temperature output characteristics can be improved. Moreover, as a result of the degree of swelling in electrolysis solution of the polymer of the core portion being no greater than the upper limit of any of the aforementioned ranges, elution of components into electrolysis solution from the core portion can be sufficiently inhibited, adhesiveness of the organic particles in electrolysis solution can be ensured, and electrochemical device high-temperature cycle characteristics and low-temperature output characteristics can be improved.

In a situation in which the electrochemical device in which the adhesive layer formed from the adhesive composition is to be used is a secondary battery or a lithium ion capacitor, the electrolysis solution used to measure the degree of swelling in electrolysis solution of the polymer of the core portion is a solution having an SP value of 12.8 $(cal/cm^3)^{1/2}$ that is obtained by dissolving $LiPF_6$ as a supporting electrolyte with a concentration of 1 mol/L in a mixed solvent of ethylene carbonate (EC), diethyl carbonate (DEC), and vinylene carbonate (VC) (volume mixing ratio: EC/DEC/VC=68.5/30/1.5). On the other hand, in a situation in which the electrochemical device in which the adhesive layer formed from the adhesive composition is to be used is an electric double-layer capacitor, the electrolysis solution used to measure the degree of swelling in electrolysis solution of the polymer of the core portion is a solution having an SP value of 11.9 $(cal/cm^3)^{1/2}$ that is obtained by dissolving tetraethylammonium tetrafluoroborate ($TEABF_4$) as a supporting electrolyte with a concentration of 1 mol/L in acetonitrile as a solvent.

Specifically, the degree of swelling in electrolysis solution of the polymer of the core portion can be measured as follows.

First, the polymer of the core portion of the organic particles is prepared. For example, the polymer may be prepared through the same process as carried out to form the core portion in production of the organic particles. The prepared polymer is then used to produce a film. For example, in a situation in which the polymer is a solid, the polymer is dried for 48 hours at a temperature of 25° C. and is subsequently formed into a film shape to produce a film of 0.5 mm in thickness. Alternatively, in a situation in which the polymer is a dispersion liquid or solution, such as a latex, the dispersion liquid or solution may, for example, be added into a polytetrafluoroethylene petri dish and dried for 48 hours at a temperature of 25° C. to produce a film of 0.5 mm in thickness.

Next, a specimen is obtained by cutting a 1 cm square from the film produced as described above. The weight of the specimen is measured and is taken to be W0. The specimen is immersed in the electrolysis solution for 72 hours at a temperature of 60° C. and is then removed from the electrolysis solution. Electrolysis solution on the surface of the removed specimen is wiped off and the weight W1 of the specimen after immersion is measured.

The weight W0 and the weight W1 are used to calculate the degree of swelling S (factor) according to S=W1/W0.

The degree of swelling in electrolysis solution of the polymer of the core portion can be adjusted, for example, by appropriately selecting, in consideration of the SP value of the electrolysis solution, the type and amount of each monomer used to produce the polymer of the core portion. In general, a polymer tends to swell more easily in an electrolysis solution when the SP value of the polymer is similar to the SP value of the electrolysis solution. Conversely, a polymer tends not to easily swell in an electrolysis solution when the SP value of the polymer differs significantly from the SP value of the electrolysis solution.

Note that the term "SP value" refers to the solubility parameter.

The SP value can be calculated by a method described in "Hansen Solubility Parameters: A User's Handbook, $2^{nd}$ Ed. (CRC Press)".

The SP value of an organic compound can be estimated from the molecular structure of the organic compound. Specifically, calculation may be performed using simulation software that can calculate an SP value from a SMILE formula (for example, "HSPiP" (http=//www.hansen-solubility.com)). This simulation software determines the SP value based on the theory described in "Hansen Solubility Parameters: A User's Handbook, $2^{nd}$ Ed., Charles M. Hansen".

One or more monomers used to produce the polymer of the core portion can be selected as appropriate such that the degree of swelling in electrolysis solution of the resultant polymer is within any of the aforementioned ranges. Examples of monomers that can be used include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; acid group-containing monomers such as carboxylic acid group-containing monomers, sulfonate group-containing monomers, phosphate group-containing monomers, and hydroxy group-containing monomers; (meth)acrylic acid derivatives such as 2-hydroxyethyl methacrylate; (meth)acrylic acid ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene-based monomers such as 1,3-butadiene and isoprene. One of such monomers may be used individually, or two or more of such monomers may be used in combination in a freely selected ratio.

In the present specification, "(meth)acryl" is used to indicate "acryl" and/or "methacryl", and "(meth)acrylo" is used to indicate "acrylo" and/or "methacrylo".

Of these monomers, (meth)acrylic acid ester monomers and (meth)acrylonitrile monomers are preferable, and (meth)acrylic acid ester monomers are more preferable as monomers used to produce the polymer of the core portion. In other words, the polymer of the core portion preferably includes a (meth)acrylic acid ester monomer unit or a (meth)acrylonitrile monomer unit, more preferably includes a (meth)acrylic acid ester monomer unit, and particularly preferably includes a monomer unit derived from methyl methacrylate. This facilitates control of the degree of swelling of the polymer.

As used in this disclosure, the phrase "includes a monomer unit" means that "a polymer obtained with the monomer includes a structural unit derived from the monomer".

The proportion constituted by the (meth)acrylic acid ester monomer unit in the polymer of the core portion is preferably at least 50 mass %, more preferably at least 60 mass %, and even more preferably at least 80 mass %, and is preferably no greater than 98 mass %, more preferably no greater than 97 mass %, and even more preferably no greater than 95 mass %. As a result of the proportion constituted by the (meth)acrylic acid ester monomer unit being at least the lower limit of any of the aforementioned ranges, electrochemical device low-temperature output characteristics can be further improved. Moreover, as a result of the proportion constituted by the (meth)acrylic acid ester monomer unit being no greater than the upper limit of any of the aforementioned ranges, adhesiveness of the organic particles in electrolysis solution can be raised and electrochemical device high-temperature cycle characteristics can be further improved.

The polymer of the core portion may include an acid group-containing monomer unit. The acid group-containing monomer is a monomer that contains an acid group and examples thereof include carboxylic acid group-containing monomers, sulfonate group-containing monomers, phosphate group-containing monomers, and hydroxy group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, 2-sulfoethyl (meth)acrylate, 2-acrylamido-2-methylpropane sulfonic acid, and 3-allyloxy-2-hydroxypropane sulfonic acid. In the present specification, "(meth)allyl" is used to indicate "allyl" and/or "methallyl".

Examples of phosphate group-containing monomers include 2-(meth)acryloyloxyethyl phosphate, methyl-2-

(meth)acryloyloxyethyl phosphate, and ethyl-(meth)acryloyloxyethyl phosphate. In the present specification, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

Of these monomers, carboxylic acid group-containing monomers are preferable, among which, monocarboxylic acids are preferable, and (meth)acrylic acid is more preferable as an acid group-containing monomer.

One acid group-containing monomer may be used individually, or two or more acid group-containing monomers may be used in combination in a freely selected ratio.

The proportion constituted by the acid group-containing monomer unit in the polymer of the core portion is preferably at least 0.1 mass %, more preferably at least 1 mass %, and even more preferably at least 3 mass %, and is preferably no greater than 20 mass %, more preferably no greater than 10 mass %, and even more preferably no greater than 7 mass %. As a result of the proportion constituted by the acid group-containing monomer unit being kept within any of the aforementioned ranges, it is possible to increase the dispersibility of the polymer of the core portion such that the shell portion partially covering the outer surface of the core portion can be more easily formed with respect to the outer surface of the polymer of the core portion in production of the organic particles.

The polymer of the core portion preferably includes a crosslinkable monomer unit in addition to the monomer units described above. The crosslinkable monomer is a monomer that can form a crosslinked structure during or after polymerization by heating or by irradiation with an energy beam. The degree of swelling of the polymer can be more easily kept within any of the aforementioned ranges through inclusion of the crosslinkable monomer unit.

Examples of crosslinkable monomers that can be used include polyfunctional monomers having at least two groups that display polymerization reactivity. Examples of polyfunctional monomers such as mentioned above include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. Of these polyfunctional monomers, ethylene glycol dimethacrylate, allyl glycidyl ether, and glycidyl methacrylate are preferable, and ethylene glycol dimethacrylate is more preferable from a viewpoint of ease of control of the degree of swelling in electrolysis solution of the polymer of the core portion. One of such monomers may be used individually, or two or more of such monomers may be used in combination in a freely selected ratio.

In general, the degree of swelling in electrolysis solution of the polymer tends to decrease as the proportion constituted by the crosslinkable monomer unit in the polymer increases. Accordingly, the proportion constituted by the crosslinkable monomer unit is preferably set in consideration of the type and amount of each monomer that is used. More specifically, the proportion constituted by the crosslinkable monomer unit in the polymer of the core portion is preferably at least 0.1 mass %, more preferably at least 0.2 mass %, and even more preferably at least 0.5 mass %, and is preferably no greater than 7 mass %, more preferably no greater than 6 mass %, and even more preferably no greater than 4.5 mass %. As a result of the proportion constituted by the crosslinkable monomer unit being at least the lower limit of any of the aforementioned ranges, adhesiveness of the organic particles in electrolysis solution can be raised and high-temperature cycle characteristics can be further improved. Moreover, as a result of the proportion constituted by the crosslinkable monomer unit being no greater than the upper limit of any of the aforementioned ranges, polymerization stability during production of the organic particles can be ensured and the organic particles can be obtained in an appropriate particulate form.

The glass transition temperature of the polymer of the core portion is preferably at least 0° C., more preferably at least 30° C., even more preferably at least 60° C., and particularly preferably at least 80° C., and is preferably no higher than 150° C., more preferably no higher than 130° C., even more preferably no higher than 110° C., and particularly preferably no higher than 100° C. As a result of the glass transition temperature of the polymer of the core portion being at least the lower limit of any of the aforementioned ranges, elution of the core portion into electrolysis solution can be sufficiently inhibited and electrochemical device electrical characteristics such as low-temperature output characteristics can be further improved. Moreover, as a result of the glass transition temperature being no higher than the upper limit of any of the aforementioned ranges, adhesiveness of the organic particles in electrolysis solution can be raised and electrochemical device electrical characteristics such as high-temperature cycle characteristics can be further improved.

The diameter of the core portion relative to the volume average particle diameter of the organic particles, which is taken to be 100%, is preferably at least 50%, more preferably at least 60%, even more preferably at least 70%, and particularly preferably at least 80%, and is preferably no greater than 99%, more preferably no greater than 98.5%, and even more preferably no greater than 98%. As a result of the diameter of the core portion being within any of the aforementioned ranges, adhesiveness of the organic particles can be raised.

The diameter of the core portion can be measured as the volume average particle diameter D50 of a particulate polymer that is obtained prior to formation of the shell portion in a production process of the organic particles. The particulate polymer prior to formation of the shell portion mentioned above is equivalent to a particulate polymer forming the core portion. The volume average particle diameter D50 of the particulate polymer prior to formation of the shell portion can be measured in the same way as the volume average particle diameter D50 of the organic particles.

—Shell Portion—

The shell portion of the organic particles is formed by a polymer having a specific degree of swelling in electrolysis solution that is smaller than the degree of swelling in electrolysis solution of the core portion. Specifically, the degree of swelling in electrolysis solution of the polymer of the shell portion is required to be greater than a factor of 1 and no greater than a factor of 4, is preferably at least a factor of 1.05, more preferably at least a factor of 1.2, and even more preferably at least a factor of 1.3, and is preferably no greater than a factor of 3.5, more preferably no greater than a factor of 3, even more preferably no greater than a factor of 2.5, and particularly preferably no greater than a factor of 2.1. As a result of the degree of swelling in electrolysis solution of the polymer of the shell portion being within any of the aforementioned ranges, adhesiveness of the organic particles in electrolysis solution can be raised and electrochemical device electrical characteristics such as high-temperature cycle characteristics can be improved.

Herein, the electrolysis solution that is used for measuring the degree of swelling in electrolysis solution of the polymer of the shell portion is the same as the electrolysis solution that is used for measuring the degree of swelling in electrolysis solution of the polymer of the core portion.

Specifically, the degree of swelling in electrolysis solution of the polymer of the shell portion can be measured as follows.

First, the polymer of the shell portion of the organic particles is prepared. For example, the polymer is produced by the same method as for production of the core portion in production of the organic particles but using a monomer composition for formation of the shell portion instead of a monomer composition for formation of the core portion.

Thereafter, the same measurement method as for the degree of swelling of the polymer of the core portion is used to produce a film from the polymer of the shell portion, obtain a specimen from the produced film, and measure the degree of swelling S thereof.

The degree of swelling in electrolysis solution of the polymer of the shell portion can be adjusted, for example, by appropriately selecting, in consideration of the SP value of the electrolysis solution, the type and amount of each monomer used to produce the polymer of the shell portion.

One or more monomers used to produce the polymer of the shell portion can be selected as appropriate such that the degree of swelling in electrolysis solution of the resultant polymer is within any of the aforementioned ranges. Examples of monomers that can be used include the same monomers as provided as examples of monomers that can be used to produce the polymer of the core portion. One of such monomers may be used individually, or two or more of such monomers may be used in combination in a freely selected ratio.

Of these monomers, an aromatic vinyl monomer is preferably used as a monomer for producing the polymer of the shell portion. In other words, the polymer of the shell portion preferably includes an aromatic vinyl monomer unit. Use of the aromatic vinyl monomer facilitates control of the degree of swelling in electrolysis solution of the polymer. Moreover, adhesiveness of the organic particles can also be further raised. Among aromatic vinyl monomers, styrene derivatives such as styrene and styrene sulfonic acid are more preferable, and styrene is even more preferable from a viewpoint of further improving low-temperature output characteristics.

The proportion constituted by the aromatic vinyl monomer unit in the polymer of the shell portion is preferably at least 50 mass %, more preferably at least 70 mass %, and even more preferably at least 85 mass %, and is preferably no greater than 100 mass %, more preferably no greater than 99.9 mass %, and even more preferably no greater than 99.5 mass %. As a result of the proportion constituted by the aromatic vinyl monomer unit being within any of the aforementioned ranges, adhesiveness of the organic particles in electrolysis solution can be raised and electrochemical device electrical characteristics such as high-temperature cycle characteristics can be further improved.

The polymer of the shell portion may contain an acid group-containing monomer unit in addition to the aromatic vinyl monomer unit. The acid group-containing monomer is a monomer that contains an acid group and examples thereof include carboxylic acid group-containing monomers, sulfonate group-containing monomers, phosphate group-containing monomers, and hydroxy group-containing monomers. Specific examples of the acid group-containing monomer include the same monomers as may be used to form an acid group-containing monomer unit in the core portion.

Of these monomers, carboxylic acid group-containing monomers are preferable, among which, monocarboxylic acids are preferable, and (meth)acrylic acid is more preferable as an acid group-containing monomer.

One acid group-containing monomer may be used individually, or two or more acid group-containing monomers may be used in combination in a freely selected ratio.

The proportion constituted by the acid group-containing monomer unit in the polymer of the shell portion is preferably at least 0.1 mass %, more preferably at least 1 mass %, and even more preferably at least 3 mass %, and is preferably no greater than 20 mass %, more preferably no greater than 10 mass %, and even more preferably no greater than 7 mass %. As a result of the proportion constituted by the acid group-containing monomer unit being kept within any of the aforementioned ranges, dispersibility of the organic particles in the adhesive layer can be improved such that the adhesive layer displays good adhesiveness across the entire surface thereof, particularly in electrolysis solution.

The polymer of the shell portion may include a crosslinkable monomer unit. Examples of crosslinkable monomers that can be used include the same monomers as provided as examples of crosslinkable monomers that can be used for the polymer of the core portion. One crosslinkable monomer may be used individually, or two or more crosslinkable monomers may be used in combination in a freely selected ratio.

The proportion constituted by the crosslinkable monomer unit in the polymer of the shell portion is preferably at least 0.1 mass %, more preferably at least 0.2 mass %, and even more preferably at least 0.5 mass %, and is preferably no greater than 5 mass %, more preferably no greater than 4 mass %, and even more preferably no greater than 3 mass %.

The glass transition temperature of the polymer of the shell portion is preferably at least 50° C., more preferably at least 60° C., even more preferably at least 70° C., and particularly preferably at least 80° C., and is preferably no higher than 200° C., more preferably no higher than 180° C., even more preferably no higher than 150° C., further preferably no higher than 130° C., and particularly preferably no higher than 110° C. As a result of the glass transition temperature of the polymer of the shell portion being at least the lower limit of any of the aforementioned ranges, the adhesive layer can be restricted from displaying strong adhesive force prior to immersion in electrolysis solution and thus blocking can be inhibited. Also, elution of the shell portion into electrolysis solution can be sufficiently inhibited and electrochemical device electrical characteristics such as low-temperature output characteristics can be further improved. Moreover, as a result of the glass transition temperature being no higher than the upper limit of any of the aforementioned ranges, adhesiveness of the organic particles in electrolysis solution can be raised and electrochemical device electrical characteristics such as high-temperature cycle characteristics can be further improved.

The average thickness of the shell portion is preferably within a specific range relative to the volume average particle diameter D50 of the organic particles. Specifically, the average thickness of the shell portion relative to the volume average particle diameter D50 of the organic particles (i.e., the core-shell ratio) is preferably at least 1.5%, and more preferably at least 2%, and is preferably no greater than 40%, more preferably no greater than 30%, and even more preferably no greater than 20%. As a result of the average thickness of the shell portion being at least the lower limit of any of the aforementioned ranges, adhesiveness of the organic particles in electrolysis solution can be raised and electrochemical device electrical characteristics such as high-temperature cycle characteristics can be further improved. Moreover, as a result of the average thickness of the shell portion being no greater than the upper limit of any of the aforementioned ranges, electrochemical device low-temperature output characteristics can be further improved.

The average thickness of the shell portion can be determined through observation of cross-sectional structure of the organic particles using a transmission electron microscope (TEM). Specifically, the TEM may be used to measure the maximum thickness of the shell portion in the cross-sectional structure of each of 20 randomly selected organic particles and an average value of the maximum thicknesses for the 20 randomly selected organic particles may be taken to be the average thickness of the shell portion. Note that in a situation in which the shell portion is composed by particles of a polymer and is formed by a single layer of the polymer particles in which the particles forming the shell portion do not overlap in a radial direction of the organic particle, the average thickness of the shell portion is taken to be the number average particle diameter of the particles forming the shell portion.

Although no specific limitations are placed on the form of the shell portion, the shell portion is preferably formed by particles of a polymer. In a situation in which the shell portion is formed by polymer particles, a plurality of the particles forming the shell portion may overlap in the radial direction of the organic particle. However, it is preferable that the shell portion is formed by a single layer of the polymer particles in which the particles forming the shell portion do not overlap in the radial direction of the organic particle.

In a situation in which the shell portion is formed by polymer particles, the number average particle diameter of the particles forming the shell portion is preferably at least 10 nm, more preferably at least 20 nm, and even more preferably at least 30 nm, and is preferably no greater than 200 nm, more preferably no greater than 150 nm, and even more preferably no greater than 100 nm. Good adhesiveness can be obtained when the number average particle diameter is kept within any of the aforementioned ranges.

The number average particle diameter of the particles forming the shell portion can be determined through observation of cross-sectional structure of the organic particles using a transmission electron microscope (TEM). Specifically, the maximum diameter of the particles forming the shell portion may be measured in the cross-sectional structure of 20 randomly selected organic particles and an average value of the maximum diameters measured with respect to these 20 randomly selected organic particles may be taken to be the number average particle diameter of the particles forming the shell portion.

[Production Method of Organic Particles]

The organic particles having the core-shell structure described above can be produced, for example, by stepwise polymerization in which the ratio of one or more monomers for the polymer of the core portion and one or more monomers for the polymer of the shell portion is changed over time. Specifically, the organic particles can be produced by continuous, multi-step emulsion polymerization or multi-step suspension polymerization in which a polymer formed in a preceding step is then covered by a polymer formed in a succeeding step.

The following describes one example of a case in which the organic particles having the core-shell structure are obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide or an azo compound such as 2,2'-azobis(2-methyl-N-(2-hydroxyethyl)propionamide) or 2,2'-azobis(2-amidinopropane) hydrochloride may be used as a polymerization initiator.

The polymerization procedure involves initially mixing one or more monomers for forming the core portion and the emulsifier, and then performing emulsion polymerization as one batch to obtain a particulate polymer that forms the core portion. The organic particles having the core-shell structure described above can then be obtained by performing polymerization of one or more monomers for forming the shell portion in the presence of the particulate polymer forming the core portion.

In this polymerization, it is preferable that the monomers for forming the polymer of the shell portion are supplied into the polymerization system continuously or divided into a plurality of portions from a viewpoint of partially covering the outer surface of the core portion with the shell portion. As a result of the monomers for forming the polymer of the shell portion being supplied into the polymerization system in portions or continuously, the polymer forming the shell portion can be formed as particles that bond to the core portion such as to form the shell portion partially covering the core portion.

In a situation in which the monomers for forming the polymer of the shell portion are supplied in a plurality of portions, the particle diameter of the particles forming the shell portion and the average thickness of the shell portion can be controlled in accordance with the proportions in which the monomers are divided into portions. On the other hand, in a situation in which the monomers for forming the polymer of the shell portion are supplied continuously, the particle diameter of the particles forming the shell portion and the average thickness of the shell portion can be controlled by adjusting the amount of the monomers that is supplied per unit time.

It tends to be easier to form the shell portion partially covering the core portion when a monomer having low affinity with the polymerization solvent is used as a monomer for forming the polymer of the shell portion. Thus, in a situation in which the polymerization solvent is water, the one or more monomers used to form the polymer of the shell portion preferably include a hydrophobic monomer, and particularly preferably include an aromatic vinyl monomer.

Moreover, it tends to be easier to form the shell portion partially covering the core portion when a smaller amount of emulsifier is used in polymerization for forming the shell portion. Accordingly, appropriate adjustment of the amount of emulsifier that is used can also enable formation of the shell portion partially covering the core portion.

The volume average particle diameter D50 of the particulate polymer forming the core portion, the volume average particle diameter D50 of the organic particles after formation of the shell portion, and the number average particle diameter of the particles forming the shell portion can be kept within the desired ranges by adjusting, for example, the amount of emulsifier and the amount of each monomer.

Furthermore, the average percentage of the outer surface of the core portion that is covered by the shell portion can be kept within the desired range by adjusting, for example, the amount of emulsifier and the amount of each monomer used for forming the polymer of the shell portion, in accordance with the volume average particle diameter D50 of the particulate polymer forming the core portion.

<Binder>

As explained above, the organic particles do not normally display strong adhesiveness unless the organic particles are in a swollen state in electrolysis solution. Therefore, to inhibit components contained in the adhesive layer from becoming detached from the adhesive layer prior to immersion in electrolysis solution, it is preferable that the adhesive composition for an electrochemical device contains a binder that displays higher adhesiveness than the organic particles at an ambient temperature of 25° C. while not swollen in electrolysis solution. Through use of a binder such as described above, detachment of components from the adhesive layer can be inhibited both when the adhesive layer is in a swollen state in electrolysis solution and when the adhesive layer is in a non-swollen state. It should be noted that the "binder" is not inclusive of the organic particles described above.

The binder used in combination with the organic particles may be a known particulate polymer, such as a thermoplastic elastomer, that is water-insoluble and can be dispersed in water. The thermoplastic elastomer is preferably a conjugated diene-based polymer or an acrylic polymer, and is more preferably an acrylic polymer.

The conjugated diene-based polymer is a polymer that includes a conjugated diene monomer unit and specific examples thereof include a polymer including an aromatic vinyl monomer unit and an aliphatic conjugated diene monomer unit, such as a styrene-butadiene copolymer (SBR). The acrylic polymer is a polymer that includes a (meth)acrylic acid ester monomer unit.

One of such binders may be used individually, or two or more of such binders may be used in combination. However, in a situation in which two or more binders are combined, these binders are different from the organic particles having the core-shell structure formed by the polymers having the specific degrees of swelling in electrolysis solution described above.

The acrylic polymer that may be used as a binder preferably further includes a (meth)acrylonitrile monomer unit. This can increase the strength of the adhesive layer.

In the acrylic polymer that may be used as a binder, the amount of the (meth)acrylonitrile monomer unit as a proportion relative to the total amount of the (meth)acrylonitrile monomer unit and the (meth)acrylic acid ester monomer unit is preferably at least 1 mass %, and more preferably at least 2 mass %, and is preferably no greater than 30 mass %, and more preferably no greater than 25 mass %. As a result of this proportion being at least the lower limit of any of the aforementioned ranges, the strength of the acrylic polymer used as a binder can be increased, and thus the strength of the adhesive layer in which the acrylic polymer is used can also be increased. Moreover, as a result of this proportion being no greater than the upper limit of any of the aforementioned ranges, the acrylic polymer used as a binder swells to an appropriate degree in electrolysis solution, which can ensure adhesiveness of the acrylic polymer in electrolysis solution.

The glass transition temperature of the binder is preferably at least −50° C., and more preferably at least −40° C., and is preferably no higher than 0° C., more preferably no higher than −5° C., even more preferably no higher than −10° C., and particularly preferably no higher than −20° C. As a result of the glass transition temperature of the binder being at least the lower limit of any of the aforementioned ranges, electrochemical device low-temperature output characteristics can be further improved. Moreover, as a result of the glass transition temperature of the binder being no higher than the upper limit of any of the aforementioned ranges, adhesiveness of the binder in electrolysis solution can be ensured and electrochemical device electrical characteristics such as high-temperature cycle characteristics can be further improved.

The volume average particle diameter D50 of the binder (particulate polymer) is preferably at least 0.1 µm and no greater than 0.5 µm. As a result of the volume average particle diameter D50 of the binder being at least the lower limit of the aforementioned range, dispersibility of the binder can be increased. Moreover, as a result of the volume average particle diameter D50 being no greater than the upper limit of the aforementioned range, adhesiveness of the binder can be raised. The volume average particle diameter D50 of the binder can be measured in the same way as the volume average particle diameter D50 of the organic particles.

The amount of the binder in the adhesive composition for an electrochemical device per 100 parts by mass of the organic particles is preferably at least 5 parts by mass, and more preferably at least 10 parts by mass, and is preferably no greater than 40 parts by mass, and more preferably no greater than 30 parts by mass. As a result of the content of the binder being at least the lower limit of any of the aforementioned ranges, adhesiveness of the adhesive layer can be ensured both prior to and during immersion in electrolysis solution and electrochemical device electrical characteristics can be further improved. Conversely, as a result of the content of the binder being no greater than the upper limit of any of the aforementioned ranges, electrochemical device low-temperature output characteristics can be ensured.

Examples of methods by which the binder can be produced include solution polymerization, suspension polymerization, and emulsion polymerization. Of these methods, emulsion polymerization and suspension polymerization are preferable in terms that polymerization can be carried out in water and a resultant aqueous dispersion containing a particulate polymer can be suitably used, as produced, as a material for the adhesive composition for an electrochemical device. In production of the polymer used as the binder, it is preferable that a dispersant is present in the reaction system. In general, the binder is substantially composed by the constituent polymer thereof, but may also be accompanied by other optional components such as an additive used in polymerization.

<Other Components>

The adhesive composition for an electrochemical device may contain other optional components besides the organic particles and the binder described above. Examples of such other components include known additives such as wetting agents, viscosity modifiers, and additives for electrolysis solution. One of such other components may be used individually, or two or more of such other components may be used in combination.

Of these other components, a wetting agent is preferably used to inhibit uneven application of the adhesive composition onto an adhesion target, such as an electrode assembly or a casing, during formation of an adhesive layer The amount of the wetting agent in the adhesive composition for an electrochemical device per 100 parts by mass of the organic particles is preferably at least 0.1 parts by mass, and more preferably at least 0.5 parts by mass, and is preferably no greater than 10 parts by mass, and more preferably no greater than 5 parts by mass. As a result of the amount of the wetting agent being at least the lower limit of any of the aforementioned ranges, uneven application of the adhesive composition can be inhibited and adhesiveness of the adhesive layer in electrolysis solution can be ensured. Conversely, as a result of the amount of the wetting agent being no greater than the upper limit of any of the aforementioned ranges, adhesiveness of the adhesive layer in electrolysis solution can be ensured.

<Production of Adhesive Composition for Electrochemical Device>

No specific limitations are placed on the production method of the adhesive composition for an electrochemical device. However, the adhesive composition is normally produced by mixing the organic particles, water that serves as a dispersion medium, and, as necessary, the binder and other components, such as the wetting agent. Although the mixing can be carried out by any method, the mixing is normally carried out using a disperser as a mixer to efficiently disperse the components.

The disperser is preferably a device that enables homogeneous dispersion and mixing of the components. Examples of devices that can be used include a ball mill, a sand mill, a pigment disperser, a grinding machine, an ultrasonic disperser, a homogenizer, and a planetary mixer. A high-level disperser that can apply a high level of dispersing shear, such as a bead mill, a roll mill, or a FILMIX, may also be used.

The surface tension of the resultant adhesive composition is preferably at least 20 mN/m, and more preferably at least 25 mN/m, and is preferably no greater than 50 mN/m, and more preferably no greater than 40 mN/m. As a result of the surface tension of the adhesive composition being at least the lower limit of any of the aforementioned ranges, adhesiveness of the resultant adhesive layer in electrolysis solution can be further improved. Conversely, as a result of the surface tension of the adhesive composition being no greater than the upper limit of any of the aforementioned ranges, uneven application of the adhesive composition onto an adhesion target, such as an electrode assembly or a casing, can be inhibited. The surface tension of the adhesive composition can be measured by the measurement method described in the EXAMPLES section of the present specification.

The surface tension of the adhesive composition can be appropriately adjusted by, for example, altering the amount of the wetting agent or the binder.

Although no specific limitations are placed on the viscosity of the adhesive composition, the viscosity is preferably at least 1 mPa·s, more preferably at least 5 mPa·s, even more preferably at least 10 mPa·s, and particularly preferably at least 15 mPa·s, and is preferably no greater than 100 mPa·s, and more preferably no greater than 90 mPa·s. As a result of the viscosity of the adhesive composition being within any of the aforementioned ranges, components such as the organic particles can be favorably dispersed in the adhesive composition and applicability of the adhesive composition onto an adhesion target, such as an electrode assembly or a casing, can be ensured. Herein, "viscosity" refers to a value measured using a B-type viscometer at a temperature of 25° C. and a rotational speed of 60 rpm.

(Adhesive Layer for Electrochemical Device)

The presently disclosed adhesive layer for an electrochemical device is formed from the adhesive composition for an electrochemical device described above. More specifically, the presently disclosed adhesive layer for an electrochemical device can be formed by drying the adhesive composition for an electrochemical device. In other words, the presently disclosed adhesive layer for an electrochemical device is a dried product of the adhesive composition for an electrochemical device that normally contains the organic particles, and optionally contains the binder and other components. In a situation in which the binder and/or a polymer in the organic particles includes a crosslinkable monomer unit, the binder and/or the polymer in the organic particles may be crosslinked during drying of the slurry composition or through optional heat treatment performed after the drying (i.e., the adhesive layer for an electrochemical device may contain a crosslinked product of the organic particles and/or the binder described above). The preferred ratio of components contained in the adhesive layer for an electrochemical device is the same as the preferred ratio of these components in the adhesive composition for an electrochemical device.

Figure 2:
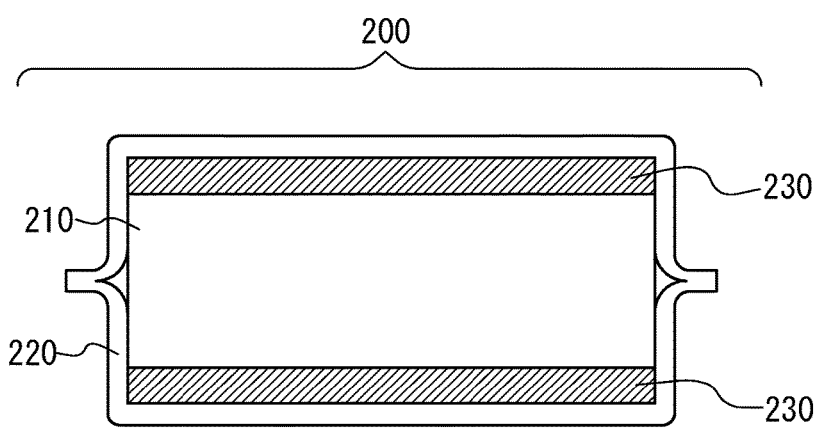
FIG. 2 is a cross-sectional view schematically illustrating an example of structure of a presently disclosed electrochemical device.

As illustrated in FIG. 2, the presently disclosed adhesive layer is provided between an electrode assembly and a casing and is used to adhere the electrode assembly and the casing to one another. The adhesive layer can maintain excellent adhesiveness in electrolysis solution as a result of containing the organic particles as described above. Moreover, an electrochemical device that includes the electrode assembly and the casing adhered through this adhesive layer can display excellent electrical characteristics.

No specific limitations are placed on the positioning method or position of the adhesive layer for an electrochemical device so long as the adhesive layer is finally provided between the electrode assembly and the casing in the electrochemical device such as to adhere the electrode assembly and the casing to one another. For example, the electrochemical device may be assembled using a casing and an electrode assembly that includes the adhesive layer at an outer surface thereof or may be assembled using an electrode assembly and a casing that includes the adhesive layer at an inner surface thereof. Moreover, so long as the electrode assembly and the casing are adhered through the adhesive layer, elements other than the adhesive layer may also be present between the electrode assembly and the casing.

Examples of methods by which the adhesive layer can be provided between the electrode assembly and the casing include, but are not specifically limited to:

1) a method in which the adhesive composition is applied onto and then dried on the outer surface of the electrode assembly or the inner surface of the casing;

2) a method in which the electrode assembly or the casing is immersed in the adhesive composition and then dried;

3) a method in which the adhesive composition is applied onto a detachable substrate and then dried to form the adhesive layer, and the resultant adhesive layer is subsequently transferred onto the surface of the electrode assembly or the surface of the casing; and 4) a method in which, in production of the electrode assembly or the casing, the adhesive layer is provided in advance on the surface of a constituent part of the electrode assembly or the casing (for example, a separator of the electrode assembly), and the constituent part including the adhesive layer is then used in production of the electrode assembly or the casing such that the adhesive layer is positioned at an outermost surface.

Of these methods, method 4 is preferable in terms of improving electrochemical device production efficiency and so forth. In one specific example of method 4, the adhesive composition is applied onto and dried on a current collector of an electrode to form the adhesive layer, and the electrode including the adhesive layer is then stacked with a separator such that the adhesive layer is positioned at an outermost surface to produce an electrode assembly in the form of a laminate. In another specific example of method 4, the adhesive composition is applied onto and dried on a separator to form the adhesive layer, and then an electrode, a separator that does not include the adhesive layer, another electrode, and the separator including the adhesive layer are stacked in this order such that the adhesive layer is positioned at an outermost surface and are wound to produce an electrode assembly in the form of a wound product.

No specific limitations are placed on the method by which the adhesive composition is applied onto the electrode assembly, the casing, or a constituent part of the electrode assembly or casing. For example, any of spray coating, doctor blading, reverse roll coating, direct roll coating, gravure coating, extrusion coating, and brush coating may be used. Of these methods, gravure coating and spray coating are preferable in terms of enabling formation of a thinner adhesive layer.

The adhesive composition applied onto the electrode assembly, the casing, or a constituent part of the electrode assembly or casing may be dried by any commonly known method such as drying by warm, hot, or low-humidity air; drying in a vacuum; or drying by irradiation with infrared light or electron beams. Although no specific limitations are placed on the drying conditions, the drying temperature is preferably from 30° C. to 80° C. and the drying time is preferably from 30 seconds to 10 minutes.

The thickness of the adhesive layer is preferably at least 0.01 μm, more preferably at least 0.1 μm, and even more preferably at least 0.5 μm, and is preferably no greater than 20 μm, more preferably no greater than 10 μm, and even more preferably no greater than 5 μm. As a result of the thickness of the adhesive layer being at least the lower limit of any of the aforementioned ranges, sufficient strength of the adhesive layer can be ensured. Moreover, as a result of the thickness of the adhesive layer being no greater than the upper limit of any of the aforementioned ranges, a thinner electrochemical device can be produced. The thickness of the adhesive layer can be easily controlled since the adhesive layer is formed through application and drying of the adhesive composition.

(Electrochemical Device)

The presently disclosed electrochemical device includes an electrode assembly, an electrolysis solution, and a casing that houses the electrode assembly and the electrolysis solution. The electrode assembly and the casing in the presently disclosed electrochemical device are adhered through the adhesive layer for an electrochemical device described above. The presently disclosed electrochemical device can display adequate electrical characteristics such as high-temperature cycle characteristics and low-temperature output characteristics as a result of the presently disclosed adhesive layer being used to secure the electrode assembly to the casing.

<Electrode Assembly>

The electrode assembly is a structure that includes constituent parts such as a plurality of electrodes and one or more separators. The electrode assembly may further include constituent parts other than electrodes and separators as necessary (for example, a porous membrane for reinforcement of an electrode or separator). The electrode assembly may for example be, but is not specifically limited to, a laminate obtained by alternately stacking the electrodes and separators or a wound product obtained by winding this laminate.

[Electrodes]

The electrodes (for example, a positive electrode and a negative electrode of a lithium ion secondary battery) are not specifically limited and may, for example, each be an electrode obtained by forming an electrode mixed material layer on a current collector.

The current collector, components in the electrode mixed material layer (for example, an electrode active material and a binder for an electrode mixed material layer), and the method by which the electrode mixed material layer is formed on the current collector may be known examples thereof such as described, for example, in JP 2013-145763 A or JP 2013-77559 A.

[Separator]

Examples of separators that can be used include, but are not specifically limited to, those described in JP 2012-204303 A. Of these separators, a microporous membrane made of polyolefinic (for example, polyethylene, polypropylene, polybutene, or polyvinyl chloride) resin is preferred, because such a membrane can reduce the total thickness of the separator, which increases the ratio of an electrode active material in the electrochemical device, and thereby increases the capacity per volume of the electrochemical device.

<Casing>

The casing is not specifically limited and may, for example, be a casing formed by a film that is a laminate of a thermoplastic resin film and metal foil. Examples of the thermoplastic resin forming the thermoplastic resin film include polypropylene and an ethylene-acrylate copolymer, of which, polypropylene is preferable. The constituent metal of the metal foil is preferably aluminum. Although no specific limitations are placed on the thickness of the film forming the casing, the thickness is normally approximately 50 μm to 300 μm. The shape of the casing may be selected as appropriate depending on the shape of the electrochemical device.

<Adhesive Layer for Electrochemical Device>

The presently disclosed electrochemical device includes the presently disclosed adhesive layer for an electrochemical device between the outer surface of the electrode assembly and the inner surface of the casing described above. The adhesive layer may cover the entire outer surface of the electrode assembly or may cover part of the outer surface of the electrode assembly, without any specific limitations, so long as the adhesive layer is capable of securing the electrode assembly to the inner surface of the casing.

<Electrolysis Solution>

The electrolysis solution is normally an organic electrolysis solution obtained by dissolving a supporting electrolyte in an organic solvent.

In the case of a lithium ion secondary battery or a lithium ion capacitor, the supporting electrolyte used in the electrolysis solution is, for example, a lithium salt such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, or $(C_2F_5SO_2)NLi$. Of these lithium salts, $LiPF_6$, $LiClO_4$, and $CF_3SO_3Li$ are preferable as they readily dissolve in solvents and exhibit a high degree of dissociation.

In the case of an electric double-layer capacitor, the supporting electrolyte may, for example, be any of those described in JP 2010-28007 A, of which, TEABF$_4$ is preferable from a viewpoint of improving low-temperature output characteristics.

One type of supporting electrolyte may be used individually, or two or more types of supporting electrolytes may be used in combination.

The organic solvent used in the electrolysis solution is not specifically limited so long as the supporting electrolyte can dissolve therein.

In the case of a lithium ion secondary battery or a lithium ion capacitor, suitable examples of the organic solvent include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region.

In the case of an electric double-layer capacitor, suitable examples of the organic solvent include the carbonates, esters, and sulfur-containing compounds described above, and nitriles such as acetonitrile. Furthermore, a mixed liquid of such solvents may be used. Of these solvents, acetonitrile is preferable from a viewpoint of improving low-temperature output characteristics.

The concentration of the electrolyte in the electrolysis solution may be adjusted as appropriate. Furthermore, known additives may be added to the electrolysis solution.

<Production Method of Electrochemical Device>

The electrochemical device can be produced, for example, by filling the casing with the electrolysis solution in a state in which the adhesive layer is present between the electrode assembly and the casing, and subsequently performing pressing, as necessary, to more strongly secure the electrode assembly to the casing. When the electrode assembly is packed in the casing, the adhesive layer is normally already adhered to either or both the outer surface of the electrode assembly and the inner surface of the casing. However, the adhesive layer may alternatively be a free-standing film that is positioned on the outer surface of the electrode assembly or the inner surface of the casing directly before the electrode assembly is packed in the casing. In order to prevent pressure-increase inside the electrochemical device and occurrence of overcharging or overdischarging, an expanded metal; an overcurrent preventing device such as a fuse or a PTC device; or a lead plate may be provided in the casing as necessary. The shape of the electrochemical device may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a structural unit formed through polymerization of a given monomer in the polymer is normally, unless otherwise specified, the same as the ratio (charging ratio) of the given monomer among all monomers used in polymerization for forming the polymer.

In the examples and comparative examples, the following methods were used to evaluate the degree of swelling in electrolysis solution of polymers forming organic particles, the average percentage of the outer surface of a core portion covered by a shell portion in organic particles (coverage rate), the average thickness of a shell portion of organic particles (core-shell ratio), the volume average particle diameter D50 of each type of particles (organic particles and binder), the glass transition temperature of each polymer (core portion polymer, shell portion polymer, and binder), the surface tension of an adhesive composition for an electrochemical device, the adhesiveness in electrolysis solution and resistance to elution into electrolysis solution of an adhesive layer for an electrochemical device, and the high-temperature cycle characteristics and low-temperature output characteristics of an electrochemical device.

<Degree of Swelling in Electrolysis Solution of Polymers Forming Organic Particles>

With respect to each of a core portion and a shell portion of organic particles, a monomer composition used to produce the core portion or shell portion was used to prepare an aqueous dispersion containing a polymer (polymer of core portion or polymer of shell portion) as a measurement sample through the same polymerization conditions as used for the core portion or shell portion.

The obtained aqueous dispersion was poured into a polytetrafluoroethylene petri dish and was dried for 48 hours at a temperature of 25° C. to produce a film of 0.5 mm in thickness. A specimen was obtained by cutting a 1 cm square from the obtained film. The weight of the specimen was measured and was taken to be W0. The specimen was then immersed in an electrolysis solution for 72 hours at a temperature of 60° C. Thereafter, the specimen was removed from the electrolysis solution, electrolysis solution on the surface of the specimen was wiped off, and the weight W1 of the specimen after immersion was measured. The weight W0 and the weight W1 were used to calculate the degree of swelling S (factor) according to S=W1/W0.

In the case of an adhesive composition used to form an adhesive layer for use in a lithium ion secondary battery, the electrolysis solution was a solution having an SP value of 12.8 $(cal/cm^3)^{1/2}$ that was obtained by dissolving LiPF$_6$ as a supporting electrolyte with a concentration of 1 mol/L in a mixed solvent of ethylene carbonate (EC), diethyl carbonate (DEC), and vinylene carbonate (VC) (volume mixing ratio: EC/DEC/VC=68.5/30/1.5).

In the case of an adhesive composition used to form an adhesive layer for use in an electric double-layer capacitor, the electrolysis solution was a solution having an SP value of 11.9 $(cal/cm^3)^{1/2}$ that was obtained by dissolving TEABF$_4$ as a supporting electrolyte with a concentration of 1 mol/L in acetonitrile as a solvent.

<Average Percentage of Core Portion Outer Surface Covered by Shell Portion in Organic Particles (Coverage Rate)>

Organic particles were sufficiently dispersed in visible light-curable resin (D-800 produced by JEOL Ltd.) and were subsequently embedded to obtain a block containing the organic particles. Next, a measurement sample was prepared by cutting a flake of 100 nm in thickness from the block using a microtome equipped with a diamond blade. The measurement sample was subsequently dyed using ruthenium tetroxide.

Next, the dyed measurement sample was set in a transmission electron microscope (JEM-3100F produced by JEOL Ltd.) and cross-sectional structure of the organic particles was imaged with an accelerating voltage of 80 kV. The magnification of the electron microscope was set such that the cross-section of one organic particle fitted within the visible field. In the imaged cross-sectional structure of the organic particle, the length D1 of a circumference of a core portion and the length D2 of a section where a shell portion was in contact with the outer surface of the core portion were measured. The percentage Rc of the outer surface of the core portion that was covered by the shell portion in the organic particle was calculated from formula (1), shown below.

Percentage coverage $Rc(\%) = (D2/D1) \times 100$    (1)

The percentage coverage Rc was measured for 20 randomly selected organic particles and an average value thereof was calculated. The average value was taken to be the average percentage of the outer surface of the core portion that was covered by the shell portion (i.e., the coverage rate).

<Average Thickness of Shell Portion of Organic Particles (Core-Shell Ratio)>

The average thickness of a shell portion of organic particles was measured by the following procedure.

In the case of a shell portion that was formed by particles of a polymer, cross-sectional structure of the organic particles was observed using a transmission electron microscope in the same way as in measurement of the coverage rate. The maximum diameter of polymer particles forming the shell portion was measured from the observed cross-sectional structure of an organic particle. The maximum diameter of polymer particles forming the shell portion was measured in this manner for 20 randomly selected organic particles and an average value of these maximum diameters was taken to be the average thickness of the shell portion.

In the case of a shell portion that was not in the form of particles, cross-sectional structure of the organic particles was observed using a transmission electron microscope in the same way as in measurement of the coverage rate. The maximum thickness of the shell portion was measured from the observed cross-sectional structure of an organic particle. The maximum thickness of the shell portion was measured in this manner for 20 randomly selected organic particles and an average value of these maximum thicknesses was taken to be the average thickness of the shell portion.

The measured average thickness of the shell portion was divided by the volume average particle diameter D50 of the organic particles to calculate the core-shell ratio (units: %), which is the ratio of the average thickness of the shell portion relative to the volume average particle diameter D50 of the organic particles. The average thickness of the shell portion was evaluated.

<Volume Average Particle Diameter D50 of Each Type of Particles>

The volume average particle diameter D50 of each type of particles (organic particles and binder) was taken to be a particle diameter at which, in a particle diameter distribution measured by a laser diffraction particle diameter distribution analyzer (SALD-3100 produced by Shimadzu Corporation) with respect to an aqueous dispersion of the particles adjusted to a solid content concentration of 15 mass %, the cumulative volume calculated from a small diameter end of the distribution reached 50%.

<Glass Transition Temperature (Tg) of Each Polymer>

With respect to each of a polymer of a core portion and a polymer of a shell portion, a monomer composition for producing the polymer was used to prepare an aqueous dispersion containing the polymer as a measurement sample through the same polymerization conditions as used to produce the polymer, and the measurement sample obtained by drying this aqueous dispersion was used in measurement of the glass transition temperature of the polymer.

Moreover, a measurement sample obtained by drying an aqueous dispersion containing a produced binder was used in measurement of the glass transition temperature of the binder.

The measurement sample was weighed into an aluminum pan in an amount of 10 g and a differential themoanalyzer (produced by SIT NanoTechnology Inc., product name: EXSTAR DSC6220) was used to measure a DSC curve with respect to the measurement sample under normal temperature and humidity with a measurement temperature range of from −100° C. to 500° C. and a heating rate of 10° C./minute, and using an empty aluminum pan as a reference. The glass transition temperature was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<Surface Tension of Adhesive Composition for Electrochemical Device>

The surface tension of an adhesive composition was measured by a platinum plate method using an automatic surface tensiometer (DY-300 produced by Kyowa Interface Science Co., Ltd.).

<Adhesiveness of Adhesive Layer for Electrochemical Device in Electrolysis Solution>

[Lithium Ion Secondary Battery]

A produced lithium ion secondary battery was left for 24 hours at an ambient temperature of 25° C. and was then subjected to a charge/discharge operation at an ambient temperature of 25° C. in which the lithium ion secondary battery was charged to 4.4 V at 1 C and discharged to 2.75 V at 1 C. The lithium ion secondary battery was subsequently subjected to 1,000 charge/discharge cycles at an ambient temperature of 60° C. Thereafter, the lithium ion secondary battery was disassembled to remove an electrode assembly still in an adhered state with a casing. One side of the casing was then peeled off at a wide surface of the casing-attached electrode assembly. Electrolysis solution was wiped from the exposed assembly side and cellophane tape was affixed to the surface of the electrode assembly. Tape prescribed by JIS Z1522 was used as the cellophane tape. The cellophane tape was affixed to a horizontal test bed. Thereafter, one end of the casing was pulled in an upward vertical direction at a pulling speed of 50 mm/minute and the stress during peeling of the casing was measured. This measurement was made three times and an average value of the stress was determined. The average value was taken to be the peel strength P, which was evaluated by the following standard. A larger measured peel strength P indicates that the adhesive layer maintains adhesiveness in electrolysis solution better and that the electrode assembly is more strongly secured to the casing.

A: Peel strength P of at least 5 N/m
B: Peel strength P of at least 3 N/m and less than 5 N/m
C: Peel strength P of at least 1 N/m and less than 3 N/m
D: Peel strength P of less than 1 N/m

[Electric Double-Layer Capacitor]

A produced electric double-layer capacitor was left for 24 hours at an ambient temperature of 25° C. and was then subjected to a charge/discharge operation at an ambient temperature of 25° C. in which the electric double-layer capacitor was charged to 3.0 V at 10 C and discharged to 2.75 V at 10 C. The electric double-layer capacitor was subsequently subjected to 1,000 charge/discharge cycles at an ambient temperature of 60° C. Thereafter, the electric double-layer capacitor was disassembled to remove an electrode assembly still in an adhered state with a casing. One side of the casing was then peeled off at a wide surface of the casing-attached electrode assembly. Electrolysis solution was wiped from the exposed assembly side and cellophane tape was affixed to the surface of the electrode assembly. Tape prescribed by JIS Z1522 was used as the cellophane tape. The cellophane tape was affixed to a horizontal test bed. Thereafter, one end of the casing was pulled in an upward vertical direction at a pulling speed of 50 mm/minute and the stress during peeling of the casing was measured. This measurement was made three times and an average value of the stress was determined. The average value was taken to be the peel strength P, which was evaluated by the following standard. A larger measured peel strength P indicates that the adhesive layer maintains adhesiveness in electrolysis solution better and that the electrode assembly is more strongly secured to the casing.

A: Peel strength P of at least 5 N/m
B: Peel strength P of at least 3 N/m and less than 5 N/m
C: Peel strength P of at least 1 N/m and less than 3 N/m
D: Peel strength P of less than 1 N/m <Resistance to Elution into Electrolysis Solution of Adhesive Layer for Electrochemical Device>

A produced adhesive composition was poured into a polytetrafluoroethylene container and was dried for 72 hours at 60° C. to prepare an adhesive layer of 500 µm in thickness. The film was cut out to a size of 1 cm×1 cm and the mass m0 thereof was measured. The adhesive layer was then immersed in an electrolysis solution solvent for 72 hours at 60° C. In the case of an adhesive composition for a lithium ion secondary battery, a mixed solvent of EC/DEC/VC (=68.5/30/1.5) was used as the solvent and in the case of an adhesive composition for an electric double-layer capacitor, acetonitrile was used as the solvent. Next, vacuum drying was carried out for 24 hours at 60° C. to remove the electrolysis solution solvent. The mass m1 of the adhesive layer was measured after this drying. A rate of mass change of the adhesive layer, $\Delta m$ (%)=(m0−m1)/m0×100, was calculated and was evaluated by the following standard. A smaller value indicates that components of the adhesive layer have a lower tendency to elute into electrolysis solution.

A: Rate of mass change $\Delta m$ of less than 0.1%
B: Rate of mass change $\Delta m$ of at least 0.1% and less than 1%
C: Rate of mass change $\Delta m$ of at least 1% and less than 5%
D: Rate of mass change $\Delta m$ of at least 5%

<High-Temperature Cycle Characteristics of Electrochemical Device>

[Lithium Ion Secondary Battery]

A produced lithium ion secondary battery was left for 24 hours at an ambient temperature of 25° C. and was then subjected to a charge/discharge operation at an ambient temperature of 25° C. in which the lithium ion secondary battery was charged to 4.4 V at 1 C and discharged to 2.75 V at 1 C. The initial capacity C0 in this operation was measured. Thereafter, the lithium ion secondary battery was repeatedly charged and discharged at an ambient temperature of 60° C. and the capacity C1 after 1,000 cycles was measured. The capacity maintenance rate before and after cycling, $\Delta C$ (%)=(C1/C0)×100, was calculated and was evaluated by the following standard. A larger value for the capacity maintenance rate $\Delta C$ indicates better high-temperature cycle characteristics.

A: Capacity maintenance rate $\Delta C$ of at least 85%
B: Capacity maintenance rate $\Delta C$ of at least 80% and less than 85%
C: Capacity maintenance rate $\Delta C$ of at least 75% and less than 80%
D: Capacity maintenance rate $\Delta C$ of less than 75%

[Electric Double-Layer Capacitor]

A produced electric double-layer capacitor was left for 24 hours at an ambient temperature of 25° C. and was then subjected to a charge/discharge operation at an ambient temperature of 25° C. in which the electric double-layer capacitor was charged to 3.0 V at 10 C and discharged to 2.75 V at 10 C. The initial capacity C0 in this operation was measured. Thereafter, the electric double-layer capacitor was repeatedly charged and discharged at an ambient temperature of 60° C. and the capacity C1 after 1,000 cycles was measured. The capacity maintenance rate before and after cycling, $\Delta C$ (%)=(C1/C0)×100, was calculated and was evaluated by the following standard. A larger value for the capacity maintenance rate $\Delta C$ indicates better high-temperature cycle characteristics.

A: Capacity maintenance rate $\Delta C$ of at least 85%
B: Capacity maintenance rate $\Delta C$ of at least 80% and less than 85%
C: Capacity maintenance rate $\Delta C$ of at least 75% and less than 80%
D: Capacity maintenance rate $\Delta C$ of less than 75%

<Low-Temperature Output Characteristics of Electrochemical Device>

[Lithium Ion Secondary Battery]

A produced lithium ion secondary battery was left for 24 hours at an ambient temperature of 25° C. Thereafter, the lithium ion secondary battery was charged to 4.4 V for 5 hours at 0.1 C and an ambient temperature of 25° C., and the voltage V0 at this time was measured. Thereafter, the lithium ion secondary battery was discharged at a discharge rate of 1 C and an ambient temperature of −10° C., and the voltage V1 at 15 seconds after the start of discharging was measured. The voltage change indicated by $\Delta V = V0 - V1$ was determined and was evaluated by the following standard. A smaller voltage change indicates better low-temperature output characteristics.

A: Voltage change $\Delta V$ of no greater than 500 mV
B: Voltage change $\Delta V$ of greater than 500 mV and no greater than 700 mV
C: Voltage change $\Delta V$ of greater than 700 mV and no greater than 900 mV
D: Voltage change $\Delta V$ of greater than 900 mV

[Electric Double-Layer Capacitor]

A produced electric double-layer capacitor was left for 24 hours at an ambient temperature of 25° C. Thereafter, the electric double-layer capacitor was charged to 3.0 V for 5 hours at 0.1 C and an ambient temperature of 25° C., and the voltage V0 at this time was measured. Thereafter, the electric double-layer capacitor was discharged at a discharge rate of 10 C and an ambient temperature of −10° C., and the voltage V1 at 1 second after the start of discharging was measured. The voltage change indicated by $\Delta V = V0 - V1$ was determined and was evaluated by the following standard. A smaller voltage change indicates better low-temperature output characteristics.

A: Voltage change $\Delta V$ of no greater than 500 mV
B: Voltage change $\Delta V$ of greater than 500 mV and no greater than 700 mV C: Voltage change ΔV of greater than 700 mV and no greater than 900 mV
D: Voltage change ΔV of greater than 900 mV Example 1

<Production of Organic Particles>

A 5 MPa pressure vessel equipped with a stirrer was charged with 75 parts of methyl methacrylate as a (meth)acrylic acid ester monomer, 4 parts of methacrylic acid as an acid group-containing monomer, 1 part of ethylene glycol dimethacrylate as a crosslinkable monomer, 1 part of sodium dodecylbenzenesulfonate as an emulsifier, 150 parts of deionized water, and 0.5 parts of potassium persulfate as a polymerization initiator for formation of a core portion of organic particles. The contents of the pressure vessel were sufficiently stirred and were then heated to 60° C. to initiate polymerization. A mixture of 19 parts of styrene as an aromatic vinyl monomer and 1 part of methacrylic acid as an acid group-containing monomer was continuously added for formation of a shell portion of the organic particles once the polymerization conversion rate reached 96%. The contents of the pressure vessel were heated to 70° C. to continue polymerization. The reaction was terminated by cooling at the point at which the polymerization conversion rate of all added monomers reached 96% to yield an aqueous dispersion containing the organic particles.

The coverage rate, core-shell ratio, and volume average particle diameter D50 of the obtained organic particles were measured. Moreover, the degree of swelling in electrolysis solution and glass transition temperature of polymers forming the organic particles were measured. The results are shown below in Table 1.

<Production of Binder (Acrylic Polymer 1)>

A reaction vessel equipped with a stirrer was charged with 70 parts of deionized water, 0.15 parts of sodium lauryl sulfate (produced by Kao Corporation, product name: EMAL 2F) as an emulsifier, and 0.5 parts of ammonium persulfate. The gas phase of the reaction vessel was purged with nitrogen gas and the contents of the reaction vessel were heated to 60° C.

A monomer mixture was prepared in a separate vessel by mixing 50 parts of deionized water, 0.5 parts of sodium dodecylbenzenesulfonate as a dispersant, 94 parts of butyl acrylate, 2 parts of acrylonitrile, 2 parts of methacrylic acid, 1 part of N-methylolacrylamide, and 1 part of allyl glycidyl ether. The monomer mixture was continuously added to the reaction vessel over 4 hours while carrying out polymerization. The reaction was carried out at 60° C. during the addition. After this addition, the contents of the reaction vessel were stirred for a further 3 hours at 70° C. to complete the reaction and yield an aqueous dispersion containing a binder (acrylic polymer 1).

The obtained binder had a volume average particle diameter D50 of 0.36 μm and a glass transition temperature of −35° C.

<Production of Adhesive Composition for Electrochemical Device>

An adhesive composition for an electrochemical device was obtained by mixing 100 parts by solid content equivalents of the aqueous dispersion containing the organic particles, 21 parts by solid content equivalents of the aqueous dispersion containing the acrylic polymer 1 as a binder, and 1 part of a wetting agent (SN 366 produced by San Nopco Limited), and by further adding deionized water to adjust the solid content concentration to 30%. The surface tension of the obtained adhesive composition was measured. The results are shown below in Table 1.

<Production of Separator for Winding>

In production of an electrode assembly, which was produced in the form of a wound product as described further below, a separator for winding was produced for short-circuit prevention. Specifically, the adhesive composition for an electrochemical device described above was applied onto a polypropylene separator (Celgard 2500 produced by Celgard, LLC.) and was dried for 3 minutes at 50° C. This operation was carried out on both sides of the separator to obtain a separator (separator for winding) including an adhesive layer for an aluminum packing case at one side and an adhesive layer for an electrode at the opposite side. The adhesive layers each had a thickness of 1 μm.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture containing a particulate binder (SBR) for a negative electrode mixed material layer. The mixture containing the particulate binder was adjusted to pH 8 through addition of 5% sodium hydroxide aqueous solution. Thereafter, unreacted monomers were removed from the mixture by heated vacuum distillation. Cooling was subsequently performed to 30° C. or lower to obtain an aqueous dispersion containing the desired particulate binder.

Next, 100 parts of artificial graphite (volume average particle diameter D50: 15.6 μm) as a negative electrode active material, 1 part by solid content equivalents of a 2% aqueous solution of a carboxymethyl cellulose sodium salt (MAC350HC produced by Nippon Paper Industries Co., Ltd.) as a thickener, and deionized water were mixed such that the solid content concentration was adjusted to 68%, and were then further mixed for 60 minutes at 25° C. Next, deionized water was used to adjust the solid content concentration to 62% and further mixing was performed for 15 minutes at 25° C. Thereafter, 1.5 parts by solid content equivalents of the aqueous dispersion containing the particulate binder described above and deionized water were added to the resultant mixed liquid such that the final solid content concentration was adjusted to 52%, and further mixing was performed for 10 minutes. The resultant mixed liquid was subjected to a defoaming process under reduced pressure to yield a slurry composition for a negative electrode having good fluidity.

A comma coater was used to apply the slurry composition for a negative electrode obtained as described above onto copper foil of 20 μm in thickness, used as a current collector, such as to have a thickness of approximately 150 μm after drying. The applied slurry composition was dried by conveying the copper foil inside a 60° C. oven for 2 minutes at a speed of 0.5 m/minute. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

<Production of Positive Electrode>

A slurry composition for a positive electrode was prepared by using a planetary mixer to mix 100 parts of LiCoO$_2$ (volume average particle diameter D50: 12 μm) as a positive electrode active material, 2 parts of acetylene black (HS-100 produced by Denki Kagaku Kogyo Kabushiki Kaisha) as a conductive material, 2 parts by solid content equivalents of polyvinylidene fluoride (#7208 produced by Kureha Corporation) as a particulate binder for a positive electrode mixed material layer, and N-methylpyrrolidone such as to have a total solid content concentration of 70%.

A comma coater was used to apply the slurry composition for a positive electrode onto aluminum foil of 20 μm in thickness, used as a current collector, such as to have a thickness of approximately 150 μm after drying. The applied slurry composition was dried by conveying the aluminum foil inside a 60° C. oven for 2 minutes at a speed of 0.5 m/minute. Thereafter, heat treatment was performed for 2 minutes at 120° C. to obtain a positive electrode web. The pre-pressing positive electrode web was rolled by roll pressing to obtain a post-pressing positive electrode including a positive electrode mixed material layer of 80 μm in thickness.

<Production of Electrode Assembly and Lithium Ion Secondary Battery>

The post-pressing positive electrode obtained as described above was cut out to a size of 49 cm×5 cm and was placed with the surface at the positive electrode mixed material layer side thereof facing upward. A separator (Celgard 2500 produced by Celgard, LLC.) that had been cut out to a size of 55 cm×5.5 cm and on which an adhesive layer had not been formed was positioned on the positive electrode. The post-pressing negative electrode obtained as described above was cut out to a size of 50 cm×5.2 cm and was placed on the separator such that the surface at the negative electrode mixed material layer side thereof faced toward the separator. The separator for winding obtained as described above was cut out to a size of 60 cm×5.5 cm and was placed at the current collector side of the negative electrode such that the adhesive layer for an electrode faced toward the negative electrode. A structure obtained by stacking the positive electrode, the separator, the negative electrode, and the separator for winding in this order was wound using a winding machine such that the adhesive layer for an aluminum packing case was positioned at the outermost circumference thereof and was pressed at 60° C. and 0.5 MPa to obtain a flat wound product. The wound product was packed in an aluminum packing case formed by a film that was a laminate of a polypropylene resin film on aluminum foil. The aluminum packing case was then filled with electrolysis solution (solvent: EC/DEC/VC (volume mixing ratio)=68.5/30/1.5, electrolyte: LiPF$_6$ of 1M concentration) such that no air remained. Thereafter, the aluminum packing case was closed by heat sealing at 150° C. to tightly seal an opening in the aluminum packing case and was pressed under conditions of 60° C. and 0.5 MPa. In this manner, a wound lithium ion secondary battery having a discharge capacity of 1,000 mAh was produced.

The high-temperature cycle characteristics and low-temperature output characteristics of the produced lithium ion secondary battery were evaluated. The results are shown below in Table 1.

Examples 2 and 3

In each example, organic particles, a binder, an adhesive composition, a separator for winding, a negative electrode, a positive electrode, an electrode assembly, and a lithium ion secondary battery were produced in the same way as in Example 1 with the exception that in production of the aqueous dispersion containing the organic particles, the proportions of monomers added for formation of the core portion of the organic particles were changed as shown below in Table 1. Each evaluation was performed in the same way as in Example 1. The results are shown below in Table 1.

Examples 4 and 5

In each example, organic particles, a binder, an adhesive composition, a separator for winding, a negative electrode, a positive electrode, an electrode assembly, and a lithium ion secondary battery were produced in the same way as in Example 1 with the exception that in production of the aqueous dispersion containing the organic particles, the types and proportions of monomers added for formation of the shell portion of the organic particles were changed as shown below in Table 1. Each evaluation was performed in the same way as in Example 1. The results are shown below in Table 1.

Examples 6 and 7

In each example, organic particles, a binder, an adhesive composition, a separator for winding, a negative electrode, a positive electrode, an electrode assembly, and a lithium ion secondary battery were produced in the same way as in Example 1 with the exception that in production of the adhesive composition, the amount of the acrylic polymer 1 used as the binder was changed as shown below in Table 1. Each evaluation was performed in the same way as in Example 1. The results are shown below in Table 1.

Example 8

Organic particles, a binder, an adhesive composition, a separator for winding, a negative electrode, a positive electrode, an electrode assembly, and a lithium ion secondary battery were produced in the same way as in Example 1 with the exception that in production of the adhesive composition, an acrylic polymer 2 produced as described below was used instead of the acrylic polymer 1 as the binder. Each evaluation was performed in the same way as in Example 1. The results are shown below in Table 1.

<Production of Binder (Acrylic Polymer 2)>

A reaction vessel equipped with a stirrer was charged with 70 parts of deionized water, 0.15 parts of sodium lauryl sulfate (produced by Kao Corporation, product name: EMAL 2F) as an emulsifier, and 0.5 parts of ammonium persulfate. The gas phase of the reaction vessel was purged with nitrogen gas and the contents of the reaction vessel were heated to 60° C.

A monomer mixture was prepared in a separate vessel by mixing 50 parts of deionized water, 0.5 parts of sodium dodecylbenzenesulfonate as a dispersant, 56 parts of butyl acrylate, 40 parts of styrene, 2 parts of methacrylic acid, 1 part of N-methylolacrylamide, and 1 part of allyl glycidyl ether. The monomer mixture was continuously added to the reaction vessel over 4 hours while carrying out polymerization. The reaction was carried out at 60° C. during the addition. After this addition, the contents of the reaction vessel were further stirred for 3 hours at 70° C. to complete the reaction and yield an aqueous dispersion containing a binder (acrylic polymer 2).

The obtained binder had a volume average particle diameter D50 of 0.3 μm and a glass transition temperature of −2° C.

Example 9

Organic particles, a binder, an adhesive composition, and a separator for winding were produced in the same way as in Example 1. Note that in measurement of the degree of swelling in electrolysis solution of the polymer of the core portion and the polymer of the shell portion of the organic particles, the electrolysis solution was changed from that used in Example 1. The results are shown below in Table 1.

In addition, an electrode for an electric double-layer capacitor, an electrode assembly, and an electric double-layer capacitor were produced as summarized below.

<Production of Electrode for Electric Double-Layer Capacitor>

A 5 MPa pressure vessel equipped with a stirrer was charged with 76 parts of 2-ethylhexyl acrylate, 4 parts of itaconic acid, 20 parts of acrylonitrile, 2 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture containing a particulate binder for an electrode mixed material layer. The mixture containing the particulate binder was adjusted to pH 8 through addition of 5% sodium hydroxide aqueous solution. Thereafter, unreacted monomers were removed from the mixture by heated vacuum distillation. Cooling was then performed to 30° C. or lower to obtain an aqueous dispersion containing the desired particulate binder.

Next, a slurry composition for an electrode was produced by mixing 100 parts of steam-activated carbon obtained using coconut husk as a raw material (YP-50F produced by Kuraray Co., Ltd.) as an electrode active material, 2.0 parts by solid content equivalents of a 1.5% aqueous solution of carboxymethyl cellulose substituted with ammonium ($NH_4$) at carboxymethyl group terminals (DN-800H produced by Daicel Corporation) as a dispersant, 5 parts of acetylene black (DENKA BLACK® powder (DENKA BLACK is a registered trademark in Japan, other countries, or both) produced by Denki Kagaku Kogyo Kabushiki Kaisha) as a conductive material, 3 parts by solid content equivalents of the aqueous dispersion containing the particulate binder, and deionized water to adjust the solid content concentration to 42%.

The slurry composition for an electrode obtained as described above was applied by doctor blading onto aluminum foil of 30 μm in thickness, used as a current collector, with an electrode formation rate of 10 m/minute. The applied slurry composition was first dried for 20 minutes at 60° C. and then for 20 minutes at 120° C. to obtain an electrode for an electric double-layer capacitor having a thickness of 100 μm.

<Production of Electrode Assembly and Electric Double-Layer Capacitor>

The electrode obtained as described above was cut out to a size of 49 cm×5 cm and was placed with the surface at the electrode mixed material layer side thereof facing upward. A separator (Celgard 2500 produced by Celgard, LLC.) that had been cut out to a size of 55 cm×5.5 cm and on which an adhesive layer had not been formed was positioned on the electrode. Another electrode obtained as described above was cut out to a size of 50 cm×5.2 cm and was positioned on the separator such that the surface at the electrode mixed material layer side thereof faced toward the separator. The separator for winding obtained as described in Example 1 was cut out to a size of 60 cm×5.5 cm and was positioned at the current collector side of one of the electrodes such that the adhesive layer for an electrode faced toward the electrode. A structure obtained by stacking the electrode, the separator, the other electrode, and the separator for winding in this order was wound using a winding machine such that the adhesive layer for an aluminum packing case was positioned at the outermost circumference thereof and was pressed at 60° C. and 0.5 MPa to obtain a flat wound product. The wound product was packed in an aluminum packing case formed by a film that was a laminate of a polypropylene resin film on aluminum foil. The aluminum packing case was then filled with electrolysis solution (solvent: acetonitrile, electrolyte: $TEABF_4$ of 1M concentration) such that no air remained. Thereafter, the aluminum packing case was closed by heat sealing at 150° C. to tightly seal an opening in the aluminum packing case and was pressed under conditions of 60° C. and 0.5 MPa. In this manner, a 500 F wound electric double-layer capacitor was produced.

The high-temperature cycle characteristics and low-temperature output characteristics of the produced electric double-layer capacitor were evaluated. The results are shown below in Table 1.

Comparative Examples 1 and 2

In each comparative example, organic particles, a binder, an adhesive composition, a separator for winding, a negative electrode, a positive electrode, an electrode assembly, and a lithium ion secondary battery were produced in the same way as in Example 1 with the exception that in production of the aqueous dispersion containing the organic particles, the proportions of monomers added for formation of the core portion and the shell portion of the organic particles were changed as shown below in Table 1. Each evaluation was performed in the same way as in Example 1. The results are shown below in Table 1.

Comparative Example 3

Organic particles, a binder, an adhesive composition, a separator for winding, a negative electrode, a positive electrode, an electrode assembly, and a lithium ion secondary battery were produced in the same way as in Example 1 with the exception that in production of the aqueous dispersion containing the organic particles, the proportions of monomers added for formation of the core portion of the organic particles were changed as shown below in Table 1. Each evaluation was performed in the same way as in Example 1. The results are shown below in Table 1.

Comparative Example 4

Organic particles, a binder, an adhesive composition, a separator for winding, a negative electrode, a positive electrode, an electrode assembly, and a lithium ion secondary battery were produced in the same way as in Example 1 with the exception that in production of the aqueous dispersion containing the organic particles, the proportions of monomers added for formation of the shell portion of the organic particles were changed as shown below in Table 1. Each evaluation was performed in the same way as in Example 1. The results are shown below in Table 1.

In Table 1, shown below:

"LIB" indicates lithium ion secondary battery;
"EDLC" indicates electric double-layer capacitor;
"MMA" indicates methyl methacrylate;

"MAA" indicates methacrylic acid;
"EDMA" indicates ethylene glycol dimethacrylate;
"AN" indicates acrylonitrile;
"ST" indicates styrene;
"NaSS" indicates sodium styrenesulfonate;
"ACL1" indicates acrylic polymer 1;
"ACL2" indicates acrylic polymer 2;
"Mixed solvent" indicates an EC/DEC/VC mixed solvent (volume mixing ratio: 68.5/30/1.5); and
"ACN" indicates acetonitrile.

TABLE 1

| | | | | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 |
|---|---|---|---|---|---|---|---|---|---|---|---|---|---|---|---|---|
| Type of electrochemical device | | | | LIB | LIB | LIB | LIB | LIB | LIB | LIB | LIB | EDLC | LIB | LIB | LIB | LIB |
| Form of electrode assembly | | | | Wound product | Wound product | Wound product | Wound product | Wound product | Wound product | Wound product | Wound product | Wound product | Wound product | Wound product | Wound product | Wound product |
| Adhesive composition for electrochemical device | Organic particles | Core portion | Degree of swelling in electrolysis solution (factor) | 9.6 | 5.3 | 28.7 | 9.6 | 9.6 | 9.6 | 9.6 | 9.6 | 13.5 | 32 | 4.1 | 2.8 | 9.6 |
| | | | Tg [°C.] | 91 | 89 | 91 | 91 | 91 | 91 | 91 | 91 | 91 | 100 | 101 | 101 | 91 |
| | | | Composition MMA [parts by mass] | 75 | 71.5 | 75.95 | 75 | 75 | 75 | 75 | 75 | 75 | 50 | 30 | 30 | 75 |
| | | | MAA [parts by mass] | 4 | 4 | 4 | 4 | 4 | 4 | 4 | 4 | 4 | 5 | 5 | 5 | 4 |
| | | | EDMA [parts by mass] | 1 | 4.5 | 0.05 | 1 | 1 | 1 | 1 | 1 | 1 | — | — | 1 | 1 |
| | | | AN [parts by mass] | — | — | — | — | — | — | — | — | — | 25 | — | — | — |
| | | | ST [parts by mass] | — | — | — | — | — | — | — | — | — | — | 45 | 44 | — |
| | | Shell portion | Degree of swelling in electrolysis solution (factor) | 1.3 | 1.3 | 1.3 | 3.5 | 2.1 | 1.3 | 1.3 | 1.3 | 2.1 | 5.5 | 5.5 | 1.3 | 5.5 |
| | | | Tg [°C.] | 100 | 100 | 100 | 102 | 83 | 100 | 100 | 100 | 100 | 98 | 98 | 98 | 98 |
| | | | Composition ST [parts by mass] | 19 | 19 | 19 | 4 | 15 | 19 | 19 | 19 | 19 | — | — | 19 | — |
| | | | NaSS [parts by mass] | 1 | 1 | 1 | — | — | 1 | 1 | 1 | 1 | 1 | 1 | 1 | 1 |
| | | | MAA [parts by mass] | — | — | — | 15 | 5 | — | — | — | — | 9 | 9 | — | 9 |
| | | | AN [parts by mass] | — | — | — | — | — | — | — | — | — | 10 | 10 | 10 | 10 |
| | | Core-shell ratio [%] | | 10 | 10 | 10 | 10 | 10 | 10 | 10 | 10 | 10 | 10 | 10 | 10 | 10 |
| | | Coverage rate [%] | | 63 | 65 | 62 | 63 | 38 | 63 | 63 | 63 | 63 | 63 | 63 | 63 | 63 |
| | | Volume average particle diameter D50 [μm] | | 0.6 | 0.6 | 0.6 | 0.6 | 0.6 | 0.6 | 0.6 | 0.6 | 0.6 | 0.6 | 0.6 | 0.6 | 0.6 |
| | | Amount [parts by mass] | | 100 | 100 | 100 | 100 | 100 | 100 | 100 | 100 | 100 | 100 | 100 | 100 | 100 |
| | Binder | Type | | ACL1 | ACL1 | ACL1 | ACL1 | ACL1 | ACL1 | ACL1 | ACL2 | ACL1 | ACL1 | ACL1 | ACL1 | ACL1 |
| | | Tg [°C.] | | −35 | −35 | −35 | −35 | −35 | −35 | −35 | −35 | −35 | −35 | −35 | −35 | −35 |
| | | Amount [parts by mass] | | 21 | 21 | 21 | 21 | 21 | 21 | 34 | 21 | 21 | 21 | 21 | 21 | 21 |
| | Wetting agent | Amount [parts by mass] | | 1.0 | 1.0 | 1.0 | 1.0 | 1.0 | 1.0 | 1.0 | 1.0 | 1.0 | 1.0 | 1.0 | 1.0 | 1.0 |
| | Surface tension [mN/m] | | | 30.5 | 30.5 | 30.5 | 30.5 | 30.5 | 32 | 28.5 | 32 | 30.5 | 31.5 | 31.2 | 31.2 | 31.4 |
| Electrolysis solution | Solvent | | | Mixed solvent | Mixed solvent | Mixed solvent | Mixed solvent | Mixed solvent | Mixed solvent | Mixed solvent | Mixed solvent | ACN | Mixed solvent | Mixed solvent | Mixed solvent | Mixed solvent |
| | Supporting electrolyte | | | LiPF$_6$ | LiPF$_6$ | LiPF$_6$ | LiPF$_6$ | LiPF$_6$ | LiPF$_6$ | LiPF$_6$ | LiPF$_6$ | TEABF$_4$ | LiPF$_6$ | LiPF$_6$ | LiPF$_6$ | LiPF$_6$ |
| | SP value [(cal/cm$^3$)$^{1/2}$] | | | 12.8 | 12.8 | 12.8 | 12.8 | 12.8 | 12.8 | 12.8 | 12.8 | 11.9 | 12.8 | 12.8 | 12.8 | 12.8 |
| Adhesiveness of adhesive layer in electrolysis solution | | | | A | A | A | B | A | B | A | B | A | D | C | B | D |
| Resistance of adhesive layer to elution into electrolysis solution | | | | A | A | B | B | A | A | A | A | A | D | D | A | C |
| High-temperature cycle characteristics | | | | A | A | B | B | B | B | B | B | A | D | C | C | C |
| Low-temperature output characteristics | | | | A | B | A | A | B | B | B | A | A | D | C | C | D |

It can be seen from Examples 1-9 and Comparative Examples 1-4 in Table 1 that an adhesive layer formed from an adhesive composition containing organic particles having the specific core-shell structure is capable of sufficiently inhibiting elution of components into electrolysis solution and maintaining excellent adhesiveness in electrolysis solution. It can also be seen that an electrochemical device including such an adhesive layer has excellent high-temperature cycle characteristics and low-temperature output characteristics.

Examples 1-3 in Table 1 demonstrate that adhesiveness of the adhesive layer in electrolysis solution, resistance of the adhesive layer to elution of components into electrolysis solution, high-temperature cycle characteristics of the lithium ion secondary battery, and low-temperature output characteristics of the lithium ion secondary battery can be further improved through adjustment of the monomer composition and degree of swelling in electrolysis solution of the core portion of the organic particles.

Moreover, Examples 1, 4, and 5 in Table 1 demonstrate that adhesiveness of the adhesive layer in electrolysis solution, high-temperature cycle characteristics of the lithium ion secondary battery, and low-temperature output characteristics of the lithium ion secondary battery can be further improved through adjustment of the monomer composition and degree of swelling in electrolysis solution of the shell portion of the organic particles.

Furthermore, Examples 1, 6, and 7 in Table 1 demonstrate that adhesiveness of the adhesive layer in electrolysis solution, high-temperature cycle characteristics of the lithium ion secondary battery, and low-temperature output characteristics of the lithium ion secondary battery can be further improved through adjustment of the amount of the binder.

Also, Examples 1 and 8 in Table 1 demonstrate that adhesiveness of the adhesive layer in electrolysis solution and high-temperature cycle characteristics of the lithium ion secondary battery can be further improved through adjustment of the monomer composition and glass transition temperature of the binder.

INDUSTRIAL APPLICABILITY

According to the present disclosure, it is possible to provide an adhesive composition for an electrochemical device that is usable for adhering an electrode assembly and a casing to one another and that is capable of forming an adhesive layer for an electrochemical device that maintains excellent adhesiveness in electrolysis solution and enables an electrochemical device to display excellent electrical characteristics.

Moreover, according to the present disclosure, it is possible to provide an adhesive layer for an electrochemical device that is usable for adhering an electrode assembly and a casing to one another, that maintains excellent adhesiveness in electrolysis solution, and that enables an electrochemical device to display excellent electrical characteristics.

Furthermore, according to the present disclosure, it is possible to provide an electrochemical device having excellent electrical characteristics.

REFERENCE SIGNS LIST 100 organic particle
110 core portion
110S outer surface of core portion
120 shell portion
200 electrochemical device
210 electrode assembly
220 casing
230 adhesive layer for electrochemical device

The invention claimed is:

1. A lithium ion secondary battery comprising
an electrode assembly, an electrolysis solution, and a casing that houses the electrode assembly and the electrolysis solution, wherein
the electrode assembly and the casing are adhered to one another through an adhesive layer obtained using an adhesive composition comprising
organic particles having a core-shell structure including a core portion and a shell portion that partially covers an outer surface of the core portion, wherein
the core portion is formed from a polymer having a degree of swelling (S factor based on weight) of at least 5 and no greater than 30, and
the shell portion is formed from a polymer having a degree of swelling (S factor based on weight) of greater than 1 and no greater than 4, wherein
the degree of swelling (S factor based on weight) is measured using an electrolysis solution having an SP value of 12.8 $(cal/cm^3)^{1/2}$ that is obtained by dissolving $LiPF_6$ as a supporting electrolyte with a concentration of 1 mol/L in a mixed solvent of ethylene carbonate, diethyl carbonate, and vinylene carbonate with volume mixing ratio of 68.5:30:1.5.

2. The lithium ion secondary battery of claim 1, wherein
the polymer forming the core portion has a glass transition temperature of at least 0° C. and no higher than 150° C., and
the polymer forming the shell portion has a glass transition temperature of at least 50° C. and no higher than 200° C.

3. The lithium ion secondary battery of claim 1, wherein
the adhesive composition further comprising
a binder having a glass transition temperature of at least 50° C. and no higher than 0° C.

4. A lithium ion capacitor comprising
an electrode assembly, an electrolysis solution, and a casing that houses the electrode assembly and the electrolysis solution, wherein
the electrode assembly and the casing are adhered to one another through an adhesive layer obtained using an adhesive composition comprising
organic particles having a core-shell structure including a core portion and a shell portion that partially covers an outer surface of the core portion, wherein
the core portion is formed from a polymer having a degree of swelling (S factor based on weight) of at least 5 and no greater than 30, and
the shell portion is formed from a polymer having a degree of swelling (S factor based on weight) of greater than 1 and no greater than 4, wherein
the degree of swelling (S factor based on weight) is measured using an electrolysis solution having an SP value of 12.8 $(cal/cm^3)^{1/2}$ that is obtained by dissolving $LiPF_6$ as a supporting electrolyte with a concentration of 1 mol/L in a mixed solvent of ethylene carbonate, diethyl carbonate, and vinylene carbonate with volume mixing ratio of 68.5:30:1.5.

5. The lithium ion capacitor of claim 4, wherein
the polymer forming the core portion has a glass transition temperature of at least 0° C. and no higher than 150° C., and the polymer forming the shell portion has a glass transition temperature of at least 50° C. and no higher than 200° C.

6. The lithium ion capacitor of claim 4, wherein
the adhesive composition further comprising
a binder having a glass transition temperature of at least 50° C. and no higher than 0° C.

7. An electric double-layer capacitor comprising
an electrode assembly, an electrolysis solution, and a casing that houses the electrode assembly and the electrolysis solution, wherein
the electrode assembly and the casing are adhered to one another through an adhesive layer obtained using an adhesive composition comprising
organic particles having a core-shell structure including a core portion and a shell portion that partially covers an outer surface of the core portion, wherein
the core portion is formed from a polymer having a degree of swelling (S factor based on weight) of at least 5 and no greater than 30, and
the shell portion is formed from a polymer having a degree of swelling (S factor based on weight) of greater than 1 and no greater than 4, wherein
the degree of swelling (S factor based on weight) is measured using an electrolysis solution having an SP value of 11.9 $(cal/cm^3)^{1/2}$ that is obtained by dissolving tetraethylammonium tetrafluoroborate as a supporting electrolyte with a concentration of 1 mol/L in acetonitrile as a solvent.

8. The electric double-layer capacitor of claim 7, wherein
the polymer forming the core portion has a glass transition temperature of at least 0° C. and no higher than 150° C., and
the polymer forming the shell portion has a glass transition temperature of at least 50° C. and no higher than 200° C.

9. The electric double-layer capacitor of claim 7, wherein
the adhesive composition further comprising
a binder having a glass transition temperature of at least −50° C. and no higher than 0° C.

* * * * *